US012125002B2

(12) United States Patent
Thoele et al.

(10) Patent No.: US 12,125,002 B2
(45) Date of Patent: Oct. 22, 2024

(54) SYSTEMS AND METHODS OF DETERMINING VEHICLE REPARABILITY

(71) Applicant: STATE FARM MUTUAL AUTOMOBILE INSURANCE COMPANY, Bloomington, IL (US)

(72) Inventors: Jody Ann Thoele, Bloomington, IL (US); Jaime Skaggs, Chenoa, IL (US); Scott Thomas Christensen, Salem, OR (US); Ashish Sawhney, Bloomington, IL (US); Neill Broadstone, Bloomington, IL (US); Angela Glusick, Bloomington, IL (US); Gustufus Phillip Theofanis, Indianapolis, IN (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 92 days.

(21) Appl. No.: 17/673,171

(22) Filed: Feb. 16, 2022

(65) Prior Publication Data
US 2023/0153766 A1  May 18, 2023

Related U.S. Application Data

(60) Provisional application No. 63/279,045, filed on Nov. 12, 2021.

(51) Int. Cl.
*G06Q 10/20* (2023.01)
*G06N 20/00* (2019.01)
(Continued)

(52) U.S. Cl.
CPC ............ *G06Q 10/20* (2013.01); *G06N 20/00* (2019.01); *G06Q 30/0283* (2013.01); *G06Q 40/08* (2013.01)

(58) Field of Classification Search
None
See application file for complete search history.

(56) References Cited

U.S. PATENT DOCUMENTS 9,311,271 B2   4/2016   Wright
9,633,487 B2   4/2017   Wright
(Continued)

FOREIGN PATENT DOCUMENTS

EP   3239686 A1   11/2017
EP   3578433 B1   8/2020
(Continued)

OTHER PUBLICATIONS

Hua, et al., "A Brief Review of Machine Learning and its Application", 2009, Information Engineering Institute Capital Normal University, entire document pertinent (Year: 2009).*
(Continued)

*Primary Examiner* — Paul S Schwarzenberg
(74) *Attorney, Agent, or Firm* — MARSHALL, GERSTEIN & BORUN LLP

(57) ABSTRACT

Systems and methods for determining a reparability of a vehicle are provided. In some embodiments, vehicle data is obtained, and a list of variables is generated from the obtained data. A machine learning algorithm may then be trained to generate a reparability metric by: (i) generating correlation metrics between the variables and costs to repair the vehicle, (ii) removing variables with correlation metrics below a threshold, and (iii) training the machine learning algorithm based upon unremoved variables.

22 Claims, 19 Drawing Sheets

(51) Int. Cl.
*G06Q 30/0283* (2023.01)
*G06Q 40/08* (2012.01)

(56) References Cited

U.S. PATENT DOCUMENTS

| | | | |
|---|---|---|---|
| 9,830,748 B2 | 11/2017 | Rosenbaum | |
| 9,990,782 B2 | 6/2018 | Rosenbaum | |
| 10,192,369 B2 | 1/2019 | Wright | |
| 10,198,879 B2 | 2/2019 | Wright | |
| 10,269,190 B2 | 4/2019 | Rosenbaum | |
| 10,467,824 B2 | 11/2019 | Rosenbaum | |
| 10,949,814 B1 * | 3/2021 | Nelson | G06Q 10/20 |
| 11,080,841 B1 * | 8/2021 | Knuffman | B64C 39/024 |
| 11,106,926 B2 * | 8/2021 | Lambert | G06Q 40/08 |
| 11,144,889 B2 * | 10/2021 | Li | G06T 7/001 |
| 11,227,452 B2 | 1/2022 | Rosenbaum | |
| 11,367,142 B1 * | 6/2022 | Wang | G06F 16/2456 |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 11,661,072 B1 * | 5/2023 | Cardona | G07C 5/02 |
| | | | 701/29.3 |
| 2021/0334767 A1 * | 10/2021 | Utke | G06Q 10/20 |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |
| 2023/0154254 A1 * | 5/2023 | Thoele | G06N 20/00 |
| | | | 701/31.5 |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

OTHER PUBLICATIONS

Treleaven, et al., Computational Finance, published in IEEE Computer (vol. 43, Issue: 12, Dec. 2010), entire document pertinent (Year: 2010).*

* cited by examiner

Vehicle Building Information

[SF1H3AFC7JNXYZ008] [Search]

ⓘ View Original ⬇ DOWNLOAD SPECS ▼

| VIN | SF1H3AFC7JNXYZ008 | Engine Type | Engine Type |
|---|---|---|---|
| MAKE | Audi | Body Type | Body Type |
| MODEL | A6 | Drive Type | Drive Type |
| YEAR | 2018 | Transmission | Transmission |
| Features | | | ▶ |
| Proactive Passenger Protection System | | | |
| Park Distance Warning | | | |
| Electronic Stability Control | | | |
| Blind Spot Warning | | | |
| Advanced Driver Assistance Feature | | | |
| Side Airbag | | | |
| 360-Degree Camera System | | | |
| Dynamic Headlight Range Control | | | |
| Lane Keeping Assist | | | |

The ontology model is applied to original build sheets through the classification process. Manufacturer-specific build sheet terms are identified and converted to common terminology as specified in the model.

FIG. 2A

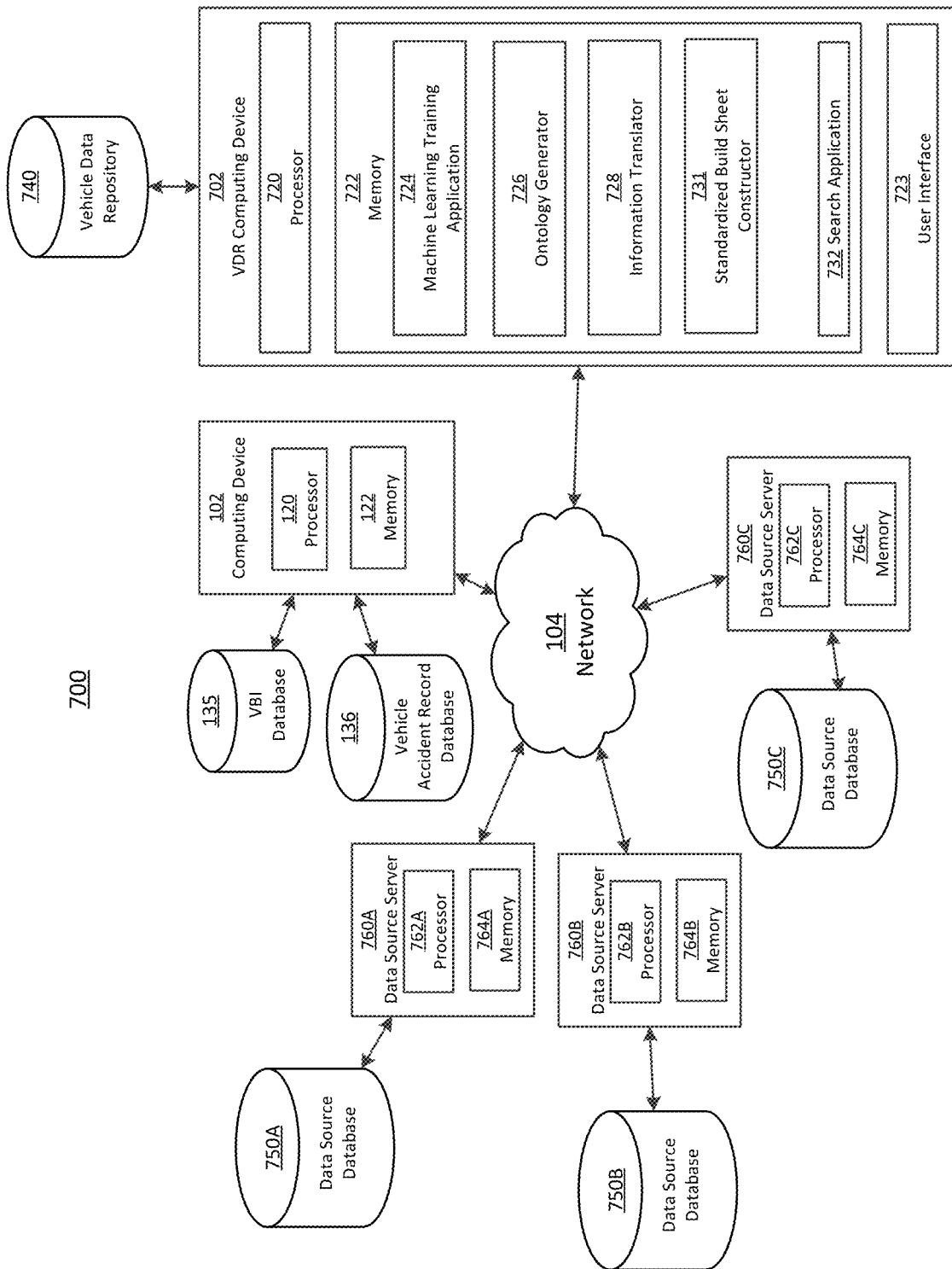

Standardized Build Sheet Fields

850 vin
make
model
model_year
trim
drivetrain
body_type
fuel_type
engine_num_cylinders
base_msrp
msrp
engine_layout
engine_capacity
engine_hp
transmission_type
transmission_speeds
wheelbase
curb_weight_lbs
gross_vehicle_weight_min_lbs
gross_vehicle_weight_max_lbs
length
width
height
truck_bed_length
tire_wheel_diameter
tire_aspect_ratio
tire_width
tire_construction
adaptive_cruise_control
adaptive_cruise_control_with_stop
backup_camera
blind_spot_warning
blind_spot_prevention
automatic_high_beams
adaptive_headlights_curve
adaptive_headlights_distance
adaptive_driving_beams
forward_collision_warning
forward_collision_warning_with_AEB
forward_collision_warning_with_AEB_and_ped_det

FIG. 8B

SYSTEMS AND METHODS OF DETERMINING VEHICLE REPARABILITY

CROSS REFERENCE TO RELATED APPLICATIONS

This application claims the benefit of U.S. Provisional Application No. 63/279,045, entitled "Systems and Methods of Determining Vehicle Reparability" (filed Nov. 12, 2021), the entirety of which is incorporated by reference herein.

FIELD OF THE DISCLOSURE

The present disclosure generally relates to vehicle safety and, more particularly, to systems and methods of determining the effectiveness of vehicle safety features. The present disclosure further relates to building a vehicle data repository and to determining reparability of a vehicle.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Currently, many vehicles are equipped with smart safety features configured to improve the safety of the vehicle. However, it can be difficult to determine which smart safety features are most effective at preventing (or decreasing the frequency or severity of) vehicle accidents.

Furthermore, current vehicle data sources store large amounts of vehicle data. However, it can be difficult to aggregate the vehicle data from the various data sources because the various data sources may, inter alia, store different kinds of vehicle data, label substantially the same vehicle feature or part differently, and/or include different levels of detail in the data.

In addition, following a vehicle accident, it is often useful to determine whether a damaged part should be repaired or replaced. However, current systems for making this determination are cumbersome and inefficient (e.g., in terms of processing efficiency).

SUMMARY

The present embodiments may include collecting initial vehicle build information for various automobiles, such as newly manufactured automobiles. The initial vehicle build information may include advanced driver assist features, autonomous or semi-autonomous vehicle features, technologies, or systems, and/or other safety and newly developed features, systems, and/or updated software versions for the systems. Vehicle data may then be collected as the vehicle is in use. For instance, operational data may be collected regarding new feature, system, and software performance and usage. The operational data may be analyzed and monitored to determine which new features, systems, and software versions are operating as intended, i.e., safely or with low risk, or with lower risk than conventional systems, and/or those technologies that need to be revised or improved upon to further lower the risk of automobile collisions and enhance vehicle safety.

In one aspect, a computer-implemented method for building a vehicle data repository may be provided. The method may include: (1) obtaining vehicle build information for a plurality of vehicles manufactured by a plurality of original equipment manufacturers (OEMs), the vehicle build information containing OEM-specific terminology associated with one or more features associated with each vehicle; (2) analyzing the obtained vehicle build information to generate an ontology model mapping each feature to any OEM-specific terminology associated with the feature for each OEM; (3) applying the ontology model to the vehicle build information to generate translated vehicle build information for each of the plurality of vehicles, such that the OEM-specific terminology associated with each feature is replaced with OEM-agnostic terminology for the feature; (4) constructing an OEM build sheet based upon the OEM-agnostic terminology; (5) obtaining a vehicle build sheet from a second data source; and (6) constructing a standardized build sheet comprising a plurality of fields, one field of the plurality of fields comprising a vehicle identification number (VIN), the standardized build sheet constructed by filling fields of the plurality of fields with information selected from the OEM build sheet and the vehicle build sheet from the second data source. The method may include additional, fewer, or alternate actions, including those discussed elsewhere herein.

In another aspect, a non-transitory computer-readable storage medium comprising instructions that, when executed, cause a processor to: (1) obtain first vehicle information from a first data source, the first data source including Original Equipment Manufacturer (OEM)-specific terminology; (2) obtain second vehicle information from a second data source, wherein the second vehicle information includes terminology specific to the second data source; (3) analyze the obtained first vehicle information and the second vehicle information to generate a first ontology model mapping at least some terms of the OEM-specific terminology with at least some terms of the terminology specific to the second data source; (4) construct a standardized build sheet comprising a plurality of fields, one field of the plurality of fields comprising a vehicle identification number (VIN); (5) analyze the first ontology model and the plurality of fields to generate a second ontology model mapping at least some terms of the first ontology model with fields of the plurality of fields; and/or (6) fill a second field of the plurality of fields by applying the second ontology to an OEM build sheet and a vehicle build sheet of the second data source. The non-transitory computer readable storage medium may include instructions that direct additional, less, or alternate functionality, including that discussed elsewhere herein.

In yet another aspect, a computer system for building a vehicle data repository may be provided. The system may comprise: one or more processors, and a non-transitory program memory communicatively coupled to the one or more processors and storing executable instructions that, when executed by the one or more processors, cause the computer system to: (1) obtain first vehicle information from a first data source, the first data source including Original Equipment Manufacturer (OEM)—specific terminology; (2) obtain second vehicle information from a second data source, wherein the second vehicle information includes terminology specific to the second data source; (3) construct a standardized build sheet comprising a plurality of fields, one field of the plurality of fields comprising a vehicle identification number (VIN); (4) generate an ontology model mapping between all three of: (i) the OEM-specific terminology, (ii) the terminology specific to the second data source, and (iii) the plurality of fields; and/or (5) fill a second field of the plurality of fields by applying the ontology model to the first vehicle information and the second vehicle information. The computer system may include additional, less, or alternate functionality, including that discussed elsewhere herein.

In addition, a computer-implemented method for use in determining reparability of a vehicle may be provided. The method may comprise: (1) obtaining vehicle data from a vehicle data repository, the vehicle data comprising vehicle parts data including parts repair cost information, and the vehicle data being stored in an original equipment manufacturer (OEM)—agnostic terminology; (2) generating a list of variables from the vehicle data; (3) training a machine learning algorithm to generate a reparability metric by: (a) inputting variables of the list of variables into the machine learning algorithm; (b) for each inputted variable, generating a correlation metric between the inputted variable and a cost to repair the vehicle; (c) for each generated correlation metric, determining if the generated correlation metric is below a correlation metric threshold; (d) in response to determining that a generated correlation metric is below the correlation metric threshold, removing the variable corresponding to the generated correlation metric from consideration by the machine learning algorithm; and/or (e) further training the machine learning algorithm based upon variables not removed from consideration by the machine learning algorithm; and/or (4) inputting information of a particular part into the trained machine learning algorithm to generate a reparability metric for the particular part. The computer-implemented method may include additional, fewer, or alternate actions, including those discussed elsewhere herein.

In another aspect, a computer system for use in determining reparability of a vehicle may be provided. The system may comprise: one or more processors; and a non-transitory program memory communicatively coupled to the one or more processors and storing executable instructions that, when executed by the one or more processors, cause the computer system to: (1) obtain vehicle data from a vehicle data repository, the vehicle data comprising vehicle parts data including parts repair cost information, and the vehicle data being stored in an original equipment manufacturer (OEM)—agnostic terminology; (2) generate a list of variables from the vehicle data; (3) train a machine learning algorithm to generate a reparability metric by: (a) inputting variables of the list of variables into the machine learning algorithm; (b) for each inputted variable, generating a correlation metric between the inputted variable and a cost to repair the vehicle; (c) for each generated correlation metric, determining if the generated correlation metric is below a correlation metric threshold; (d) in response to determining that a generated correlation metric is below the correlation metric threshold, removing the variable corresponding to the generated correlation metric from consideration by the machine learning algorithm; and/or (e) further training the machine learning algorithm based upon variables not removed from consideration by the machine learning algorithm; and/or (4) input information of a particular part into the trained machine learning algorithm to generate a reparability metric for the particular part. The computer system may include additional, less, or alternate functionality, including that discussed elsewhere herein.

In yet another aspect, a non-transitory computer-readable storage medium comprising instructions that, when executed, cause a processor to: (1) obtain vehicle data from a vehicle data repository, the vehicle data comprising vehicle parts data including parts repair cost information, and insurance claim information, and the vehicle data being stored in an original equipment manufacturer (OEM)—agnostic terminology; (2) train a machine learning algorithm to generate a reparability metric by: (a) inputting the vehicle data including the parts repair cost information, and the insurance claim information into the machine learning algorithm; (b) creating groups from the inputted vehicle data, the groups based on one or more of: (i) frequency of repairing vehicle parts, (ii) frequency of repairing a vehicle part along with another vehicle part, (iii) cost of repairing vehicle parts, and/or (iv) insurance claims; and (c) further training machine learning algorithm based upon the created groups; and/or (3) input information of a particular part into the trained machine learning algorithm to generate a reparability metric for the particular part. The non-transitory computer-readable storage medium may include instructions that direct additional, less, or alternate functionality, including that discussed elsewhere herein.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

FIG. 2A illustrates an example of applying an ontology model to OEM-specific vehicle build information to generate translated vehicle build information, such that OEM-specific terminology associated with smart safety features is replaced with OEM-agnostic terminology for the smart safety features, in accordance with some embodiments;

FIG. 7 illustrates an exemplary computer system for constructing a vehicle data repository;

FIG. 8B illustrates an example of standardized build sheet fields;

Figure 1:
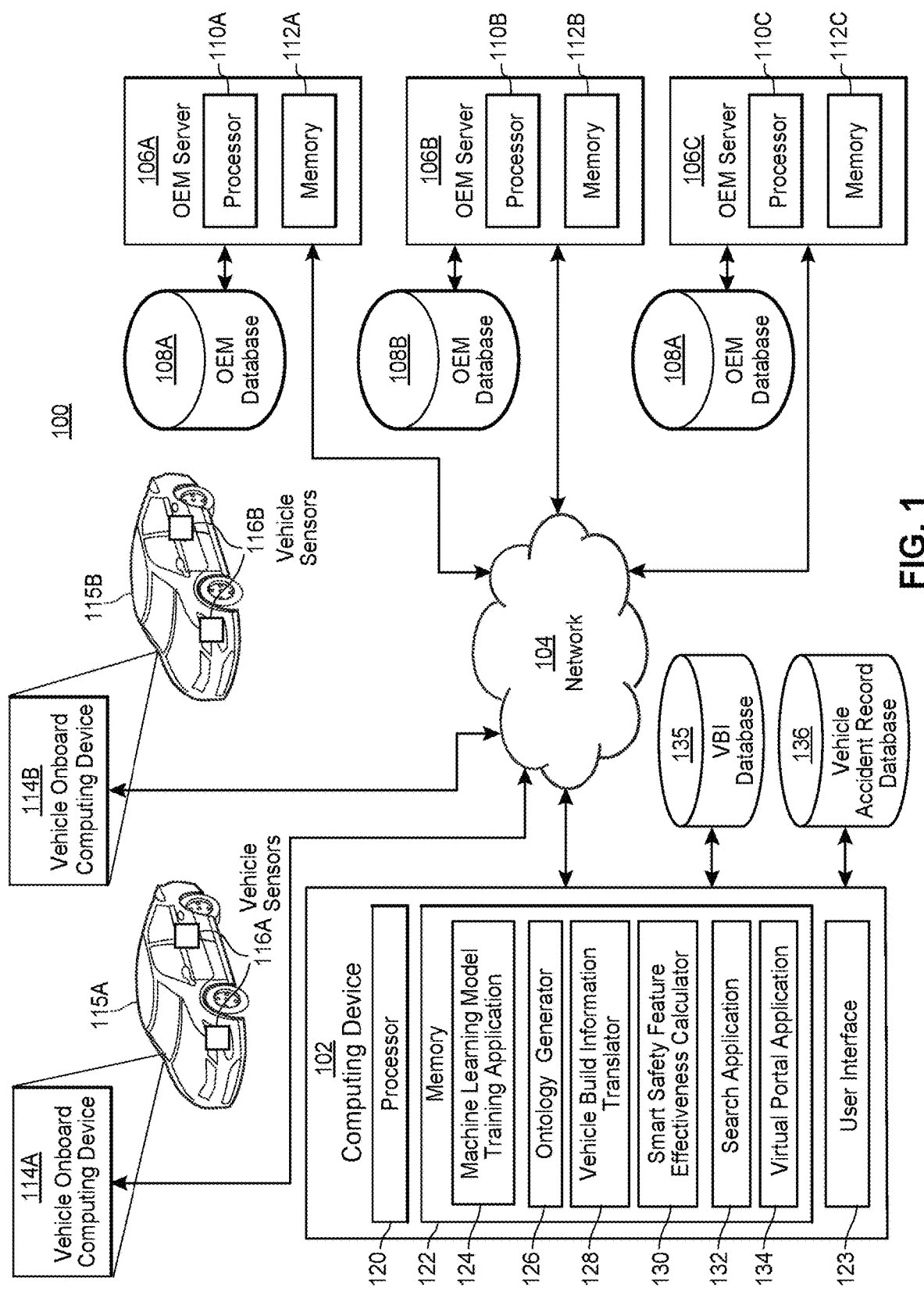
FIG. 1 illustrates a block diagram of an exemplary computer system for determining the effectiveness of vehicle safety features, in accordance with some embodiments.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Currently, many vehicles are equipped with smart safety features configured to improve the safety of the vehicle (also called "advanced vehicle safety features" (AVSFs)). These smart safety features may include, e.g., smart parking assistance, adaptive cruise control, adaptive headlights, blind spot monitoring, forward collision warning, automatic emergency braking, automatic emergency steering, lane-departure warning, lane centering, rear cross-traffic alerts, smart vehicle cameras, driver assist technologies, semi-autonomous and/or autonomous technologies and systems, etc. However, it can be difficult to determine which smart safety features are most effective at preventing (or decreasing the frequency or severity of) vehicle accidents.

While vehicle accident records may provide information indicating vehicle accident data sorted by vehicle identification number (VIN), VINs currently may not provide an indication of whether a vehicle is equipped with a particular smart safety feature. That is, while a VIN includes information such as the year, the make, and the model of the vehicle, there can be great variability in smart safety features even between vehicles of the same year, make, and model due to the highly customizable nature of smart safety features. Furthermore, in many instances, smart safety features may be switched on or off by a vehicle operator. However, vehicle accident records currently do not include information indicating whether or not a particular smart safety feature was switched on or off at the time of an accident.

Moreover, even if the smart safety features of a given vehicle are known, it can be difficult to compare the effectiveness of smart safety features between vehicle manufacturers because different vehicle manufacturer often use different terminology for the same safety technology. For example, while many original equipment manufacturers (OEMs) manufacture vehicles enabled with blind spot detection, one OEM may call this feature "lane change assist," while another OEM calls this feature "blind spot monitor." Furthermore, in some examples, one OEM may use different terminology for the same feature in marketing (e.g., "pre-sense") compared to in technical documents (e.g., "blind spot information system").

Systems and methods of determining the effectiveness of vehicle safety features are provided herein. In particular, vehicle build information obtained directly from a plurality of OEMs may be analyzed to generate an ontology mapping similar or same smart safety features between OEMs. For instance, machine learning or natural language processing may be used to group similar terminology from different OEMs, e.g., based upon similarities between descriptions of each term and/or based upon similarities between the terms themselves. Using the generated ontology, build information from a variety of vehicles from different OEMs may be translated into a common language. For example, the terms "lane change assist," "blind spot monitor," "pre-sense," and "blind spot info system," as indicated in build information from vehicles from different OEMs, may each be translated to an umbrella term "blind spot detection."

Accordingly, the translated build information for each vehicle may be cross-referenced to vehicle accident records associated with the vehicle's VIN. Using the translated build information and the vehicle accident record for each vehicle, a number, frequency, severity, etc. of accidents associated with each smart safety feature may be calculated to determine an effectiveness score for each smart safety feature. In some examples, telematics data captured by sensors associated with the vehicle may be analyzed to determine whether or not the smart safety feature was switched on at the time of the accident, and this determination may factor into the effectiveness score for the smart safety feature. Moreover, in some examples, a data log from a computing device associated with the vehicle may be analyzed to determine whether the smart safety feature had been updated at the time of the accident, or what version of software associated with the smart safety feature was used at the time of the accident, and this determination may factor into the effectiveness score for the smart safety feature as well.

In particular, the effectiveness scores for various smart safety features may be compared, ranked, etc. Practically speaking, the effectiveness scores for the smart safety features of a given vehicle may be provided to consumers, who may use these effectiveness scores for smart safety features associated with various vehicles to determine which vehicles are safest (e.g., when renting a vehicle, when purchasing a vehicle, when being transported by a vehicle when using a taxi or ride share service, etc.). Moreover, the effectiveness scores for the smart safety features of a given vehicle may be provided to OEMs, who may use this information to improve smart safety features and/or to develop more effective smart safety features.

Furthermore, in some examples, the effectiveness scores for each of the smart safety features of a given vehicle may be used to determine an insurance rating score for the vehicle and/or an insurance rating score for an insured party associated with the vehicle. Determining insurance ratings based upon the effectiveness scores for the smart safety features of a vehicle in this way improves upon conventional methods of determining insurance rating scores for vehicles, because conventionally, insurance rating scores for vehicles are simply based upon the make, model, and year of the vehicle, as indicated by the vehicle's VIN. However, with the introduction of smart safety features, there is now great variability in safety features even between vehicles of the same make, model, and year.

Consequently, conventional methods for determining insurance ratings for vehicles cannot account for specific information about which smart safety features are enabled for a particular vehicle. In contrast, the present disclosure provides ways of improving upon these conventional methods for determining insurance ratings by individualizing these ratings for specific vehicles by incorporating effectiveness scores for various smart safety features enabled for the vehicle into these insurance ratings.

Exemplary System for Determining Safety Effectiveness

Referring now to the drawings, FIG. 1 illustrates a block diagram of an exemplary computer system 100 for determining the effectiveness of vehicle safety features, in accordance with some embodiments. The high-level architecture illustrated in FIG. 1 may include both hardware and software applications, as well as various data communications channels for communicating data between the various hardware and software components, as is described below. The system may include a computing device 102 configured to communicate, e.g., via a network 104 (which may be a wired or wireless network), with OEM servers 106A, 106B, 106C associated with various OEMs. Although three OEM servers 106A, 106B, 106C associated with three separate OEMs are shown in FIG. 1, a greater or lesser number of OEM servers may be included in various embodiments. The OEM servers 106A, 106B, 106C may each respectively be associated with OEM databases 108A, 108B, 108C storing, inter alia, vehicle build information (e.g., in the form of vehicle build sheets) associated with vehicles manufactured by the OEM.

Furthermore the OEM servers 106A, 106B, 106C may each respectively include one or more processors 110A, 110B, 110C, such as one or more microprocessors, controllers, and/or any other suitable type of processor. The OEM servers 106A, 106B, 106C may each respectively further include a memory 112A, 112B, 112C (e.g., volatile memory, non-volatile memory) accessible by the respective one or more processors 110A, 110B, 110C, (e.g., via a memory controller). The respective one or more processors 110A, 110B, 110C may each interact with the respective memories 112A, 112B, 112C to obtain, for example, computer-readable instructions stored in the respective memories 112A, 112B, 112C. Additionally or alternatively, computer-readable instructions may be stored on one or more removable media (e.g., a compact disc, a digital versatile disc, removable flash memory, etc.) that may be coupled to the OEM servers 106A, 106B, 106C to provide access to the computer-readable instructions stored thereon. In particular, the computer-readable instructions stored on the respective memories 112A, 112B, 112C may include instructions for transmitting vehicle build information from the respective OEM databases 108A, 108B, 108C to the computing device 102 (e.g., via the network 104).

The computing device 102 may further communicate with vehicle onboard computing devices 114A, 114B associated with respective vehicles 115A, 115B. For example, the vehicle onboard computing devices may interface with vehicle sensors 116A, 116B associated with respective vehicles 115A, 115B. The vehicle sensors 116A, 116B may include, e.g., accelerometers, gyroscopes, cameras or other image sensors, light sensors, microphones or other sound sensors, or any other suitable sensors. In particular, the vehicle sensors 116A, 116B may be configured to capture telematics data associated with respective vehicles 115A, 115B. Telematics data may include, e.g., one or more of speed data, acceleration data, braking data, cornering data, object range distance data (e.g., following distance data), turn signal data, seatbelt use data, location data, phone use data, date/time data, weather data, road type data, or any other suitable vehicle telematics data. Although two vehicles 115A, 115B and two associated vehicle onboard computing devices 114A, 114B and sets of vehicle sensors 116A, 116B are shown in FIG. 1, any number of vehicles, vehicle onboard computing devices, and/or vehicle sensors may be included in various embodiments.

The vehicle onboard computing devices 114A, 114B may each respectively include one or more processors (not shown) such as one or more microprocessors, controllers, and/or any other suitable type of processor. The vehicle onboard computing devices 114A, 114B may each respectively further include a memory (not shown), e.g., volatile memory, non-volatile memory, etc., accessible by the respective one or more processors (e.g., via a memory controller). The respective one or more processors associated with each vehicle onboard computing device 114A, 114B may each interact with the respective memories to obtain, for example, computer-readable instructions stored in the respective memories. Additionally or alternatively, computer-readable instructions may be stored on one or more removable media (e.g., a compact disc, a digital versatile disc, removable flash memory, etc.) that may be coupled to each vehicle onboard computing device 114A, 114B to provide access to the computer-readable instructions stored thereon.

In particular, the computer-readable instructions stored on the respective memories of each vehicle onboard computing device 114A, 114B may include instructions for controlling the vehicle (e.g., controlling the braking, steering, headlights, cameras, or other components of the vehicle) in order to enable smart safety features such as, e.g., smart parking assistance, adaptive cruise control, adaptive headlights, blind spot monitoring, forward collision warning, automatic emergency braking, automatic emergency steering, lane-departure warning, lane centering, rear cross-traffic alerts, smart vehicle cameras, etc. For instance, the instructions may include instructions for controlling the respective vehicle 115A, 115B to enable smart safety features based upon inputs from the respective sensors 116A, 116B.

Furthermore, these instructions may include instructions for transmitting telematics data associated with respective vehicles 115A, 115B to the computing device 102 (e.g., via the network 104). Moreover, these instructions may include instructions for transmitting (e.g., via the network 104) indications of which smart safety features associated with the respective vehicle 115A, 115B were enabled or activated at various dates or times, either automatically or based upon a request from the computing device 102.

Furthermore the computing device 102 may include one or more processors 120 such as one or more microprocessors, controllers, and/or any other suitable type of processor. The computing device 102 may further include a memory 122 (e.g., volatile memory, non-volatile memory) accessible by the one or more processors 120, (e.g., via a memory controller). Additionally, the computing device may include a user interface 123.

The one or more processors 120 may interact with the memory 122 to obtain, for example, computer-readable instructions stored in the memory 122. Additionally or alternatively, computer-readable instructions may be stored on one or more removable media (e.g., a compact disc, a digital versatile disc, removable flash memory, etc.) that may be coupled to the computing device 102 to provide access to the computer-readable instructions stored thereon. In particular, the computer-readable instructions stored on the memory 122 may include instructions for executing various applications, such as, e.g., a machine learning model training application 124, an ontology generator 126, a vehicle build information translator 128, a smart safety feature effectiveness calculator 130, a search application 132, and/or a virtual portal application 134.

For example, the machine learning model training application 124 may train a machine learning model to group similar terminology from different OEMs, e.g., based upon similarities between descriptions of each term and/or based upon similarities between the terms themselves, using several known OEM-specific terms from each of a plurality of OEMs.

In general, training the machine learning model (and/or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The ontology generator 126 may apply the trained machine learning model to the vehicle build information from the OEM databases 108A, 108B, 108C in order to generate an ontology model mapping similar or same smart safety features between OEMs to OEM-specific terminology describing each feature for the OEMs associated with OEM servers 106A, 106B, 106C.

The vehicle build information translator 128 may apply the ontology model to the vehicle build information from the OEM databases 108A, 108B, 108C to translate the vehicle build information each of the different OEMs into a common language (i.e., by translating OEM-specific terminology to OEM-agnostic terminology). For example, the vehicle build information stored in the OEM database 108A may use the OEM-specific term "lane change assist," to describe a blind spot detection smart safety feature, while the vehicle build information stored in the OEM database 108B may use the OEM-specific term "blind spot monitor" to describe a blind spot detection feature that is substantially the same, the OEM database 108C may use the OEM-specific term "blind spot info system" to describe the same blind spot detection feature, etc. The vehicle build information translator 128 may translate each of these terms to an OEM-agnostic term for the smart safety feature, e.g., "blind spot detection smart safety feature." In particular, the vehicle build information translator 128 may store the translated vehicle build information in a vehicle build information (VBI) database 135.

The smart safety feature effectiveness calculator 130 may use the translated vehicle build information from the VBI database 135, along with information obtained from a vehicle accident record database 136 storing indications of accident history associated with various vehicles, and/or vehicle telematics data from vehicle onboard computing devices 114A, 114B (e.g., indicative of vehicle collisions, indicative of which smart safety features were operating during vehicle collisions, etc.), to calculate effectiveness scores for each smart safety feature. For instance, an accident rate may be calculated for all vehicles associated with a particular OEM-agnostic term for a smart safety feature, and the effectiveness of the smart safety feature may be calculated based at least in part on this accident rate.

Moreover, in some examples, the smart safety feature effectiveness calculator 130 may calculate a score indicative of the relevance of a given smart safety feature's performance in particular accidents. For instance, this score may indicate whether the smart safety feature's performance was likely relevant to a particular accident or collision, and/or whether the smart safety feature was likely operating as intended during a particular accident or collision. Moreover, in some examples, the smart safety feature effectiveness calculator 130 may calculate a percentage of fault associated with each smart safety feature for a particular accident or collision.

Figure 2B:
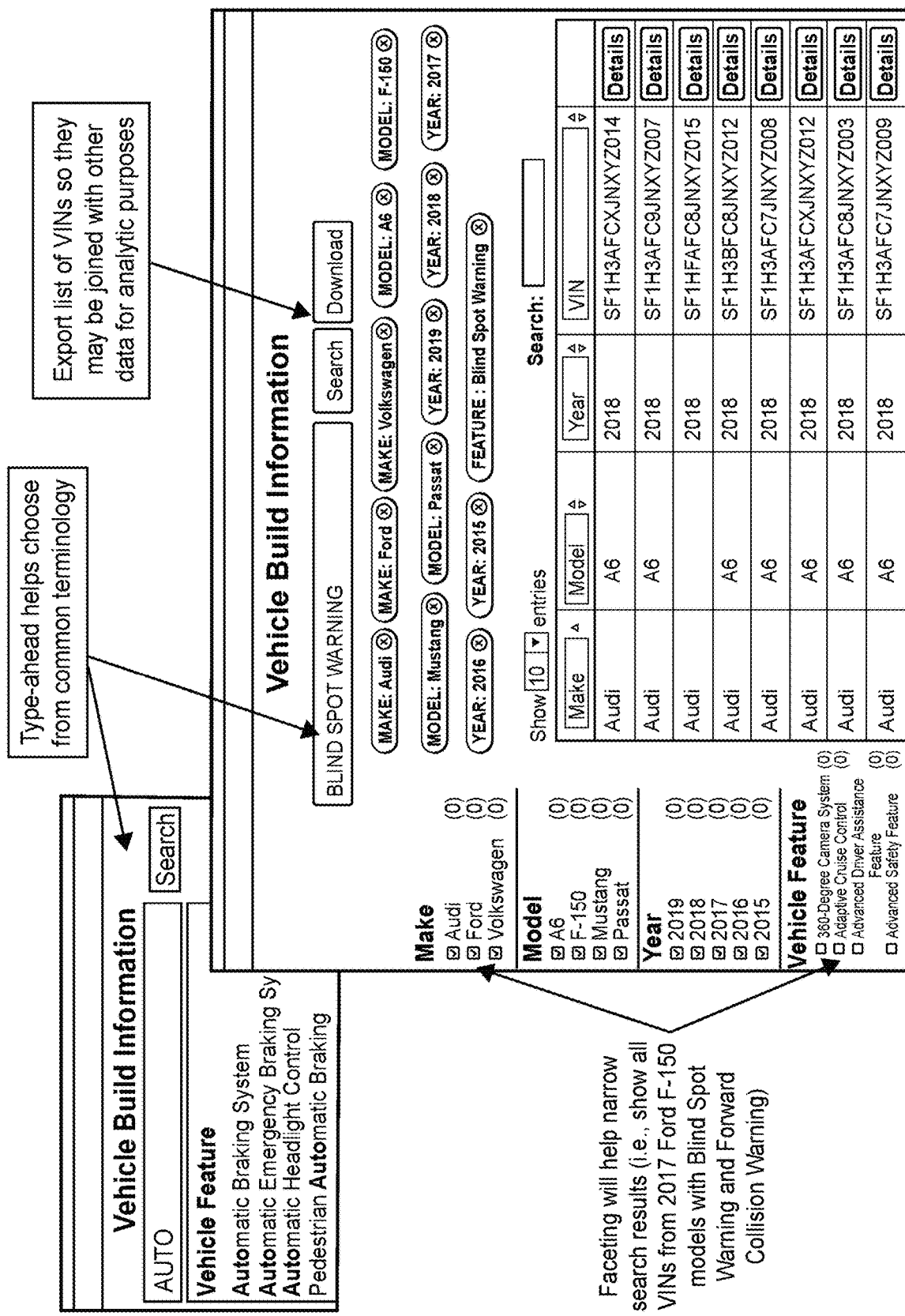
FIG. 2B illustrates an exemplary display of a user interface for searching for vehicles that have a particular type of smart safety feature, in accordance with some embodiments.

The search application 132 may provide a search feature to be displayed to a user via, e.g., via a web interface or via the user interface 123. In one example, the search application 132 may receive user input indicating a vehicle identification number (VIN) to be searched, and may search the vehicle build information to locate a matching vehicle and its associated smart safety features. Accordingly, the search application 132 may cause the user interface 123 to display, based upon the user input, a listing of smart safety features associated with the VIN, e.g., as shown in FIG. 2A. As another example, the search application 132 may receive user input indicating a smart safety feature to be searched, and may cause the user interface 123 to display, based upon the user input, a listing of vehicles having the smart safety feature and/or a listing of vehicle identification numbers (VINs) associated with those vehicles, e.g., as shown in FIG. 2B. In some examples, the user may use any terminology (e.g., OEM-specific terminology or OEM-agnostic terminology) for the feature, and the ontology model may be used to translate the user's input into OEM-agnostic terminology for the feature. Accordingly, the search application 132 may search the vehicle build information using the OEM-agnostic terminology and locate results to be displayed to the user.

Figure 3:
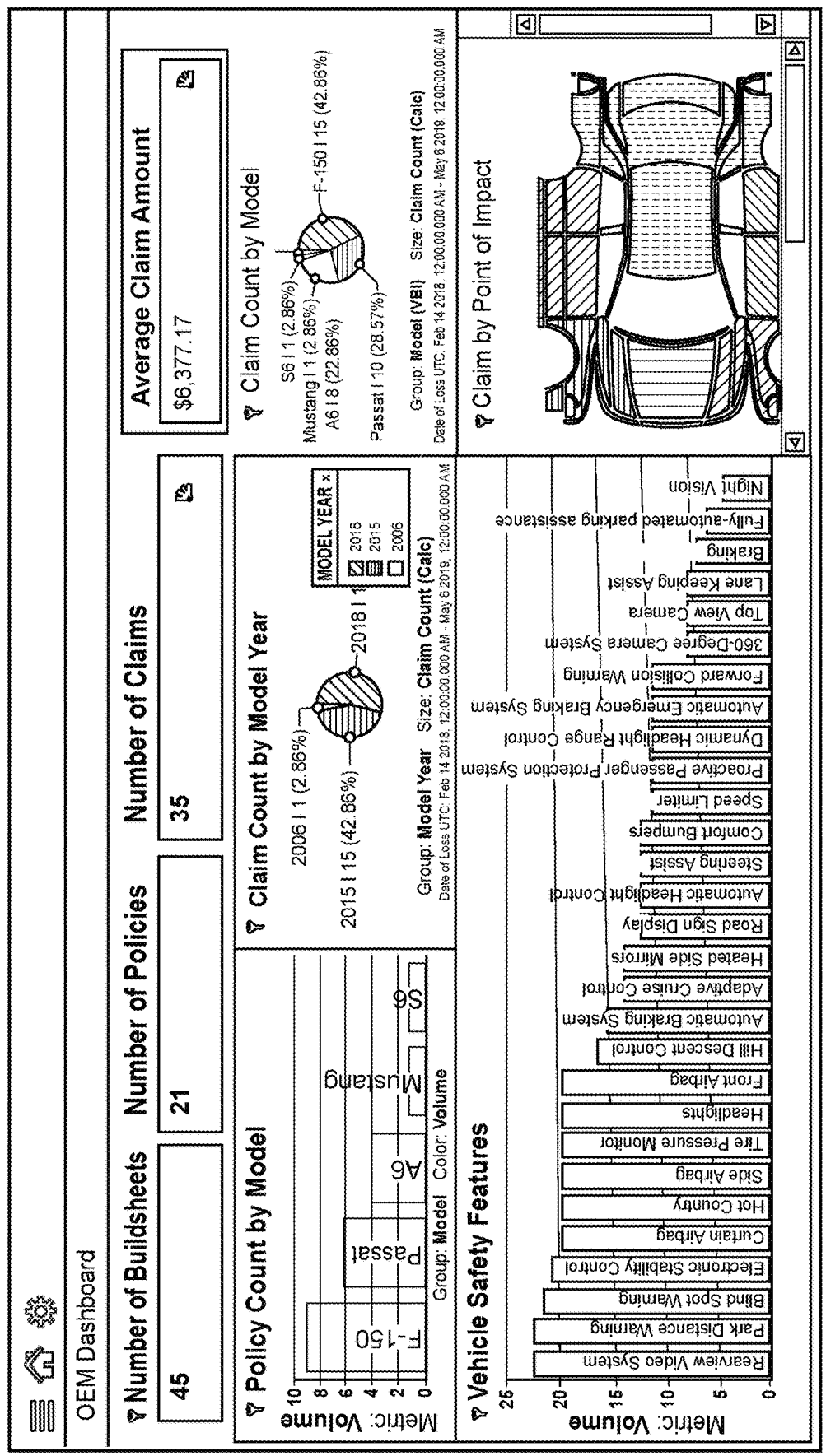
FIG. 3 illustrates an exemplary display of a user interface for a virtual portal for providing information about the performance of smart safety features to OEMs, in accordance with some embodiments.

The virtual portal application 134 may generate a virtual portal that provides information about the performance of various smart safety features and display the virtual portal to a user, e.g., via a web interface or via the user interface 123, e.g., as shown in FIG. 3. The virtual portal application 134 may cause the user interface 123 to display, for instance, smart feature effectiveness information and/or scores, as calculated by the smart safety feature effectiveness calculator 130.

Additionally, the virtual portal application 134 may cause the user interface 123 to display information related to various vehicle models manufactured by a particular OEM to a user associated with the OEM (e.g., a representative of the OEM). For instance, virtual portal application 134 may cause the user interface 123 to display an indication of a number of smart safety features associated with each vehicle model, a number of insurance policies associated with each vehicle model and/or associated with each smart safety feature, a number of insurance claims associated with each vehicle model and/or associated with each smart safety feature, a number of insurance claims associated with each vehicle model by year, etc. Moreover, the virtual portal application 134 may cause the user interface 123 to display an indication of a number of claims at each point of impact for a particular vehicle model and/or for a particular AVSF. This information may be displayed visually (e.g., by shading a portion of a diagram of a vehicle in different colors based upon the number of claims associated with that portion of the vehicle), or as a graph (e.g., in the form of a pie chart, bar graph, histogram, etc. illustrating a number of claims associated with various vehicle portions).

Moreover, the computer-readable instructions stored on the memory 122 may include instructions for carrying out any of the steps of the methods 400, 500, and 600 described in greater detail below with respect to FIGS. 4, 5, and 6, respectively. Furthermore, the computer-readable instructions stored on the memory 122 may include instructions for executing additional or alternative applications in various embodiments.

FIG. 2A illustrates an example of applying an ontology model to OEM-specific vehicle build information to generate translated vehicle build information, such that OEM-specific terminology associated with smart safety features is replaced with OEM-agnostic terminology for the smart safety features, in accordance with some embodiments. For instance, "lane change assist and lane keeping system," from the vehicle build sheet of a vehicle manufactured by a particular OEM, may be translated to the OEM-agnostic term "blind spot warning." In particular, FIG. 2A illustrates an example display of a user interface (e.g., user interface 123) showing the results of a search for a vehicle having a particular vehicle identification number (VIN). Accordingly, using this user interface, a user who looks up a particular VIN may see results indicating the OEM-agnostic terminology for smart safety features that are associated with the vehicle having the particular VIN.

FIG. 2B illustrates an exemplary display of a user interface (e.g., user interface 123) for searching for vehicles that have a particular type of smart safety feature, in accordance with some embodiments. When a user searches for a particular feature using the user interface shown in FIG. 2B, using OEM-agnostic terminology or any OEM-specific terminology for the feature, the user interface may display a listing of all vehicles (and/or the VINs associated therewith) associated with that feature. In other words, the user may use any terminology for the feature, and the ontology model may be used to translate the user's search into OEM-agnostic terminology for the feature. Accordingly, the translated vehicle build information may be searched to locate vehicles associated with the feature, and the VINs for vehicles associated with the feature may be displayed to the user.

For instance, in the context of an insurance provider, the search features shown at FIGS. 2A and 2B may be utilized, e.g., in order to analyze loss data for setting rates for vehicles with certain features, to apply rating groups based upon vehicle features, to verify the presence of vehicle features for claim processing and/or fraud-detection purposes, and to analyze the effectiveness and/or performance of various vehicle features.

FIG. 3 illustrates an exemplary display of a user interface (e.g., user interface 123) for a virtual portal for providing information about the performance of smart safety features to OEMs, in accordance with some embodiments. For example, using the user interface shown, information related to various vehicle models manufactured by the OEM may be displayed for an OEM user (e.g., a representative of the OEM). For instance, the user interface may display an indication of a number of smart safety features associated with each vehicle model, a number of insurance policies associated with each vehicle model and/or associated with each smart safety feature, a number of insurance claims associated with each vehicle model and/or associated with each smart safety feature, a number of insurance claims associated with each vehicle model by year, etc.

The user interface shown in FIG. 3 may further display an indication of a number of claims at each point of impact for a particular vehicle model and/or for a particular smart safety feature. This information may be displayed visually (e.g., by shading a portion of a diagram of a vehicle in different colors based upon the number of claims associated with that portion of the vehicle), or as a graph (e.g., in the form of a pie chart, bar graph, histogram, etc. illustrating a number of claims associated with various vehicle portions).

For instance, in the context of an OEM, the virtual portal shown at FIG. 3 may be utilized, e.g., in order to inform future vehicle design decisions of vehicle feature sets, to understand the effectiveness of vehicle features and/or repair costs, and/or to factor insurance costs into the "total cost of ownership" for their vehicles.

Exemplary Safety Effectiveness Determination

Figure 4:
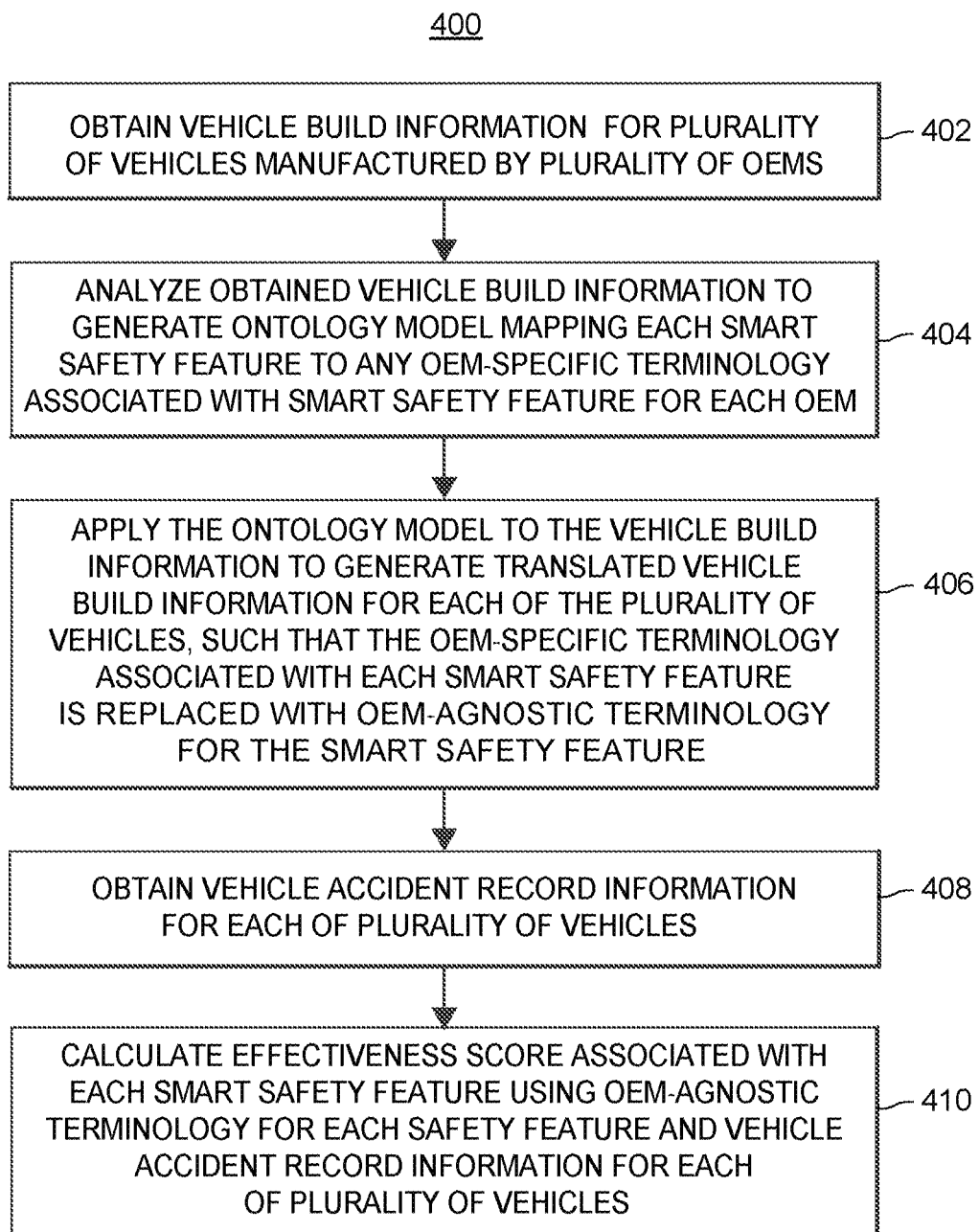
FIG. 4 illustrates a flow diagram of an exemplary computer-implemented method for determining the effectiveness of vehicle safety features, in accordance with some embodiments.

FIG. 4 illustrates a flow diagram of an exemplary method 400 for determining the effectiveness of vehicle safety features, in accordance with some embodiments. One or more steps of the method 400 may be implemented as a set of instructions stored on a computer-readable memory and executable on one or more processors. While "smart safety features" are discussed herein, the method 400 may be applied to determine the effectiveness of any kind of vehicle safety features.

Vehicle build information for a plurality of vehicles manufactured by a plurality of OEMs may be obtained (block 402), e.g., from databases associated with each OEM. For example, the vehicle build information obtained from each OEM may include information from vehicle build sheets for each individual vehicle manufactured by that OEM, with each vehicle build sheet listing all features of the individual vehicle.

The vehicle build information may contain, for instance OEM-specific terminology associated with one or more smart safety features associated with each vehicle. For instance, a first OEM may use the terminology "lane change assist" for a blind spot detection smart safety feature, while a second OEM may use the terminology "blind spot info system," and a third OEM may use the terminology "blind spot monitor," for essentially the same blind spot detection smart safety feature. As another example, a first OEM may use the terminology "adaptive cruise assist" for an adaptive cruise control feature, while a second OEM may use the terminology "predictive cruise control," and a third OEM may use the terminology "active cruise control," for essentially the same adaptive cruise control feature. Consequently, in some examples, vehicle build sheets for vehicles manufactured by different OEMs may each have different OEM-specific terminology for the essentially the same smart safety features.

The obtained vehicle build information may be analyzed (block 404) by a processor to generate an ontology model mapping each smart safety feature to any OEM-specific terminology associated with the smart safety feature for each OEM. For instance, the ontology model may map the OEM-specific terms: "lane change assist," "blind spot info system," and "blind spot monitor" to the smart safety feature of blind spot detection. As another example, the ontology model may map "adaptive cruise assist," "predictive cruise control," and "active cruise control," to the smart safety feature of adaptive cruise control.

In some examples, a machine learning model may be trained using OEM-specific terminology associated with each of a plurality of known smart safety features for a plurality of OEMs. For instance, machine learning or natural language processing may be used to group similar terminology from different OEMs, e.g., based upon similarities between descriptions of each term and/or based upon similarities between the terms themselves. The trained machine learning model may be applied to the obtained vehicle build information in order to identify OEM-specific terminology associated with each smart safety feature for each OEM.

The ontology model may be applied (block 406) to the vehicle build information (e.g., as shown in FIG. 2A) to generate translated vehicle build information for each of the plurality of vehicles, such that the OEM-specific terminology associated with each smart safety feature is replaced with OEM-agnostic terminology for the smart safety feature. For instance, wherever OEM-specific terms such as "the OEM-specific terms: "lane change assist," "blind spot info system," and "blind spot monitor" appear in the vehicle build information for each of the plurality of vehicles, these terms may be replaced with an OEM-agnostic term (e.g., "blind spot detection feature"). Similarly, wherever OEM-specific terms such as "adaptive cruise assist," "predictive cruise control," and "active cruise control," appear in the vehicle build information for each of the plurality of vehicles, these terms may be replaced with an OEM-agnostic term (e.g., "adaptive cruise control feature"). Accordingly, the terminology used in the vehicle build information associated with each vehicle may be standardized such that the vehicle build information for each of the plurality of vehicles uses the same OEM-agnostic terminology when referring to features that are the same or essentially the same.

Vehicle accident record information may be obtained (block 408) for each of the plurality of vehicles. The vehicle accident record information may include, e.g., a number of accidents, a frequency of accidents, or a severity of accidents associated with each of the plurality of vehicles. Moreover, the vehicle accident record information may include dates and/or times associated with accidents associated with each of the plurality of vehicles.

An effectiveness score may be calculated (block 410) for each smart safety feature using the OEM-agnostic terminology for each smart safety feature associated with each vehicle and the vehicle accident record information for each vehicle. That is, by using OEM-agnostic terminology, effectiveness scores may be calculated for particular types of safety features present in vehicles manufactured by a variety of different OEMs. For instance, the effectiveness of blind spot detection features in general may be calculated for a plurality of vehicles associated with various OEMs. In some examples, these effectiveness scores may be generated or scored as percentages (e.g., 88% effective, 50% effective), or on a numerical scale (e.g., on a scale of 1-10).

Generally speaking, a higher effectiveness score may be calculated for smart safety features that are associated with vehicles that have fewer, less frequent, and/or less severe accidents or collisions. In some examples, calculating the effectiveness score may include obtaining vehicle telematics data and/or other data indicating whether smart safety features were activated and/or enabled at various dates or times for each of the plurality of vehicles. For instance, the vehicle telematics data and the vehicle accident record information for each vehicle may be used to determine whether a smart safety feature was activated or deactivated at a date and/or time associated with a vehicle accident.

Additionally, if a smart safety feature of a vehicle was deactivated at a date and/or time of an accident associated with the vehicle, then the data from that accident may not be included in the calculation of the effectiveness score for that smart safety feature, but if the smart safety feature was activated at the date and/or time of the accident, then the data from that accident may be included in the calculation of the effectiveness score for that smart safety feature. In some examples, the telematics data may be used to determine whether a smart feature was updated prior to a date and/or time associated with a vehicle accident, and/or when the smart feature was last updated prior to the accident, and this determination may be factored into the calculation of the effectiveness score for the smart safety feature.

Additionally, in some examples, calculating the effectiveness score may be based on an operational design domain of the safety feature, the road upon which the vehicle was operating and/or the environment in which the vehicle was operating at the date and/or time of the accident. Generally speaking, an operational design domain for a safety feature may include operating conditions under which the safety feature is specifically designed to function, including, but not limited to, environmental, geographical, and time-of-day restrictions, and/or the requisite presence or absence of certain traffic or roadway characteristics. For instance, an effectiveness score may be calculated for a specific safety feature in a specific driving environment. For instance, in some examples, the effectiveness score for a given safety feature may be calculated differently for vehicles operating on a divided highway than for vehicles operating on a city street. As another example, an effectiveness score may be calculated for a specific safety feature at night compared to during the day, on roads with a steep incline compared to flat roads, or for various other operational design domains.

Furthermore, in some examples, an effectiveness score may be calculated for a combination of smart safety features. For instance, in some examples, two or more smart safety features may be particularly effective when used in combination. Accordingly, individual effectiveness scores may be calculated for individual smart safety features, while combined effectiveness scores may be calculated for certain combinations of smart safety features. For example, a combined effectiveness score may be calculated for vehicles having both a blind spot detection feature and an adaptive cruise control feature.

Moreover, in some examples, the method 400 may include determining an insurance rating for a particular vehicle based upon the effectiveness scores associated with each smart safety feature associated with the vehicle, and/or based upon a particular combination of smart safety features associated with the vehicle. For example, insurance customers who own vehicles that have smart safety features with high effectiveness scores may be eligible for lower rates, or for certain discounts.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, life, health, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Exemplary Computer-Implemented Methods

Figure 5:
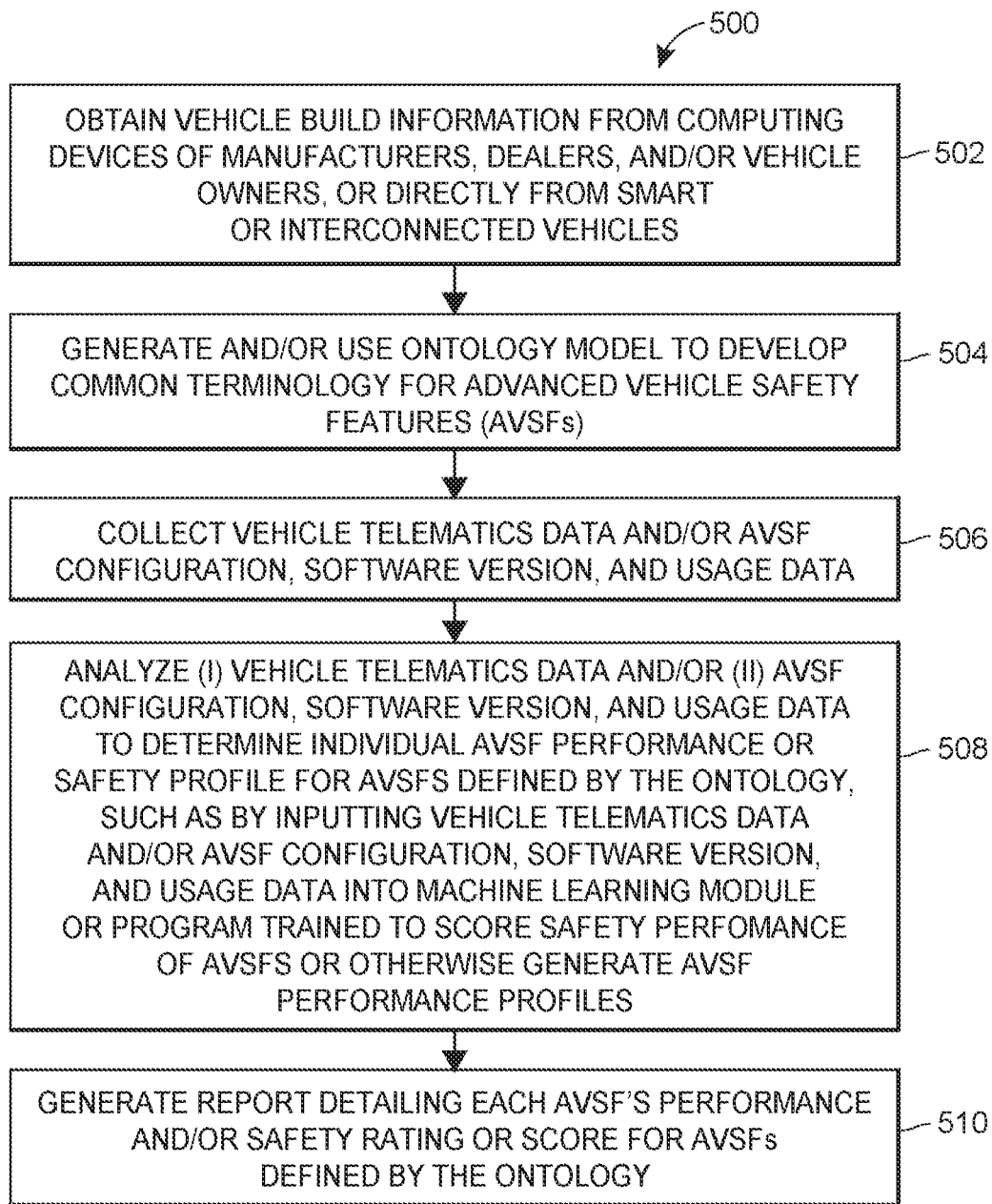
FIG. 5 illustrates an exemplary computer-implemented method of analyzing performance of advanced vehicle safety features.

FIG. 5 illustrates an exemplary computer-implemented method of analyzing performance of advanced vehicle safety features 500. The method 500 may include, via one or more processors and/or associated transceivers, obtaining, collecting, or receiving (such as via wireless communication or data transmission over one or more radio frequency links) vehicle build information for multiple automobiles from computing devices associated from vehicle manufacturers, dealerships, repair shops, and/or vehicle owners, or directly from smart vehicles, autonomous vehicles, and/or other vehicles configured for wireless communication with other computing devices 502. The vehicle build information may include one or more advanced vehicle safety features (AVSFs) as described and discussed elsewhere herein.

The method 500 may include, via one or more processors and/or associated transceivers, generating and/or using an ontology module to develop a common terminology for advanced vehicle safety features (AVSFs) 504, such as described and detailed elsewhere herein. For instance, different OEMs may use different terminology for similar vehicle safety features. The ontology may convert the different terminology from the OEMs into a common vocabulary.

The method 500 may include, via one or more processors and/or associated transceivers, collecting or receiving (such as via wireless communication or data transmission from a driver or passenger mobile device or a vehicle controller/transceiver over one or more radio frequency links) (i) vehicle telematics data (associated with individual vehicle operation, such as speed, acceleration, cornering, braking, location, etc.), and/or (ii) AVSF configuration, software version, and/or usage data 506.

The AVSF configuration data may include various settings of an AVSF established or set by a vehicle owner. The AVSF software version data may include a version of software or current version of software installed on the AVSF or AVSF memory unit. The AVSF usage data may include data detailing whether and to what extent the AVSF is or was used on a given day or trip. For instance, some vehicle owners may decide not to employ or rely upon advanced vehicle safety features, while other vehicle owners may always use or employ the AVSFs available to them or installed on their vehicles.

The method 500 may include, via one or more processors, analyzing (i) the vehicle telematics data, and/or (ii) the AVSF configuration, software version, and/or usage data to determine an individual advanced vehicle safety feature performance or safety profile for AVSFs defined by the ontology 508. In one embodiment, the vehicle telematics data, and/or the AVSF configuration, software version, and/or usage data may be input into a machine learning program, module, model, or algorithm trained to determine an AVSF performance or safety profile or score based upon vehicle telematics data, and/or AVSF configuration, software version, and/or usage data. As an example, when a processor determines that an AVSF is in use, vehicle operation may be monitored to determine whether the AVSF and/or vehicle is operating or performing as expected or designed. The AVSF, and/or the safety performance thereof, may then be assigned a score and a performance profile of the AVSF updated.

In general, training the machine learning model (or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The method 500 may include, via one or more processors, generating a virtual report detailing each AVSF's performance and/or safety rating or score for AVSFs defined by the ontology 510. The virtual report may be shared with vehicle owners, dealerships, repair shops, and/or OEMs via a website or virtual portal. The method 500 may include additional, fewer, or alternate actions, including those discussed elsewhere herein.

Figure 6:
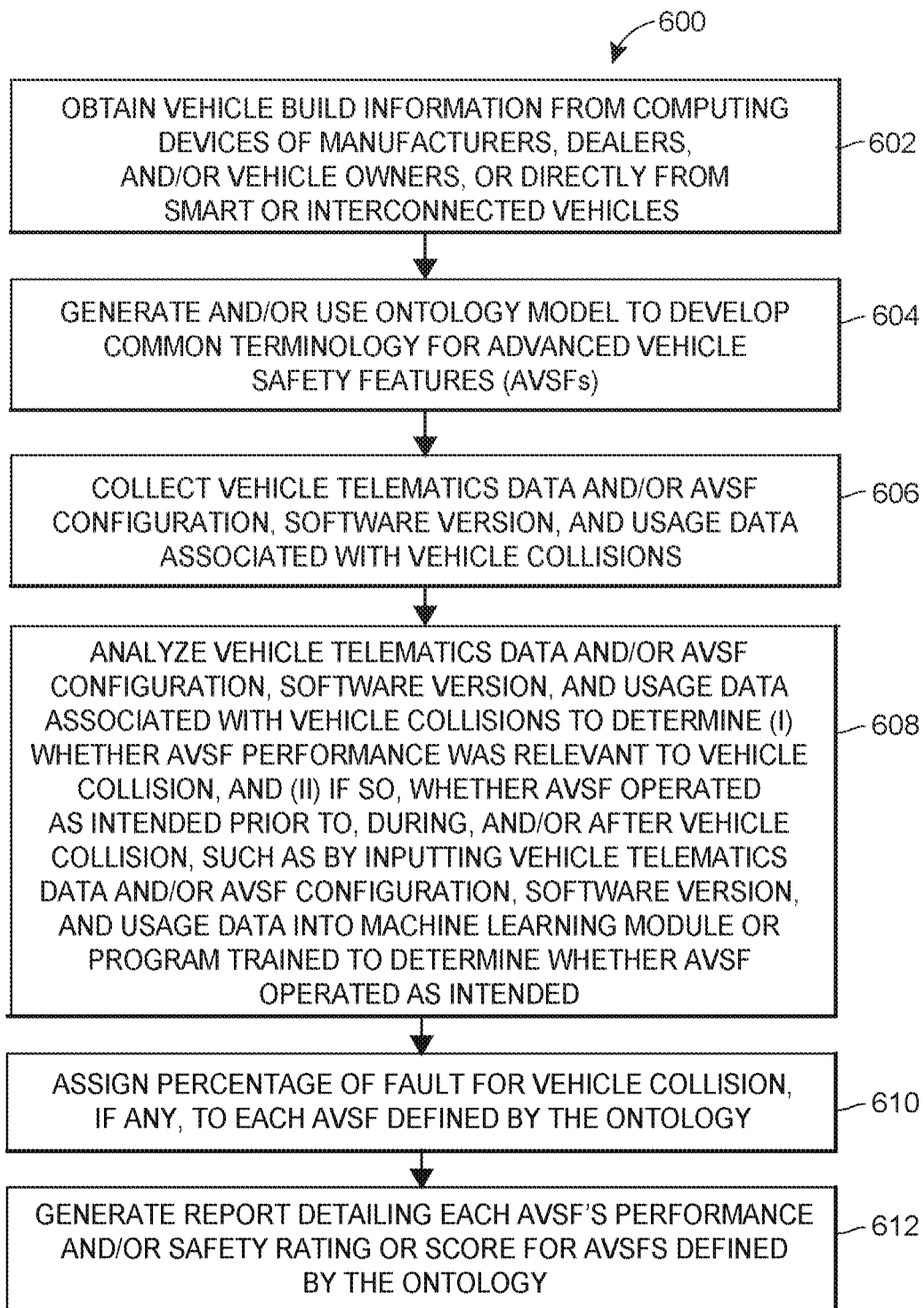
FIG. 6 illustrates another exemplary computer-implemented method of analyzing performance of advanced vehicle safety features.

FIG. 6 illustrates another exemplary computer-implemented method of analyzing performance of advanced vehicle safety features 600. The method 600 may include, via one or more processors and/or associated transceivers, obtaining, collecting, or receiving vehicle build information for multiple automobiles from computing devices associated from vehicle manufacturers, dealerships, repair shops, and/or vehicle owners, or directly from smart vehicles, autonomous vehicles, and/or other vehicles configured for wireless communication with other computing devices 602, such as described with respect to FIG. 5 above. Also as discussed with respect to FIG. 5 above, the method 600 may include, via one or more processors and/or associated transceivers, generating and/or using an ontology module to develop a common terminology for advanced vehicle safety features (AVSFs) 604.

The method 600 may include, via one or more processors and/or associated transceivers, collecting or receiving (such as via wireless communication or data transmission from a driver or passenger mobile device or a vehicle controller/transceiver over one or more radio frequency links) (i) vehicle telematics data (associated with individual vehicle operation, such as speed, acceleration, cornering, braking, location, etc.) associated with (such as collected prior to, during, and/or after) a vehicle collision, and/or (ii) AVSF configuration, software version, and/or usage data associated with (such as collected prior to, during, and/or after) a vehicle collision 606.

As noted above during the discussion of FIG. 5, the AVSF configuration data may include various settings of an AVSF established or set by a vehicle owner. The AVSF software version data may include a version of software or current version of software installed on the AVSF or AVSF memory unit. The AVSF usage data may include data detailing whether and to what extent the AVSF is or was used on a given day or trip. For instance, some vehicle owners may decide not to employ or rely upon advanced vehicle safety features, while other vehicle owners may always use or employ the AVSFs available to them or installed on their vehicles.

The method 600 may include, via one or more processors, analyzing (i) the vehicle telematics data associated with a vehicle collision, and/or (ii) the AVSF configuration, software version, and/or usage data associated with the vehicle collision to determine an individual advanced vehicle safety feature performance or safety profile for AVSFs defined by the ontology 608. In one embodiment, the vehicle telematics data associated with the vehicle collision, and/or the AVSF configuration, software version, and/or usage data associated with the vehicle collision may be input into a machine learning program, module, model, or algorithm trained to determine an AVSF performance or safety profile or score based upon vehicle telematics data associated with the vehicle, and/or AVSF configuration, software version, and/or usage data associated with the vehicle collision. As an example, when a processor determines that an AVSF is in use, vehicle operation may be monitored to determine whether the AVSF and/or vehicle is operating or performing as expected or designed prior to, during, and/or after a vehicle collision.

As an example, when a processor determines that an AVSF is in use, vehicle operation may be monitored to determine whether the performance of the AVSF was relevant to a collision. For instance, determining whether the AVSF and/or vehicle is operating or performing as expected or designed prior to, during, and/or after the vehicle collision may include inputting vehicle telematics data and/or AVSF configuration, software version, and usage data into machine learning module or program trained to determine whether the AVSF and/or vehicle is operating or performing as expected or designed. Similarly, determining whether the performance of the AVSF was relevant to the collision may include inputting vehicle telematics data and/or AVSF configuration, software version, and usage data into machine learning module or program trained to determine whether the performance of the AVSF was relevant to the collision. The AVSF, and/or the safety performance thereof, may then be assigned a score and a performance profile of the AVSF updated.

As discussed above with respect to FIG. 5, in general, training the machine learning model (or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The method 600 may include, via one or more processors, assigning a percentage of fault for a vehicle collision to each AVSF defined by the ontology based upon the analysis of the telematics data and AVSF data associated with the vehicle collision or collisions. After which, as discussed with FIG. 5, the method 600 may include, via one or more processors, generating a virtual report detailing each AVSF's performance and/or safety rating or score for AVSFs defined by the ontology 612. The virtual report may be shared with vehicle owners, dealerships, repair shops, and/or OEMs via a website or virtual portal. The method 600 may include additional, fewer, or alternate actions, including those discussed elsewhere herein.

Exemplary Advanced Vehicle Safety Feature Analysis

In one aspect, a computer-implemented method for determining the effectiveness of vehicle safety features may be provided. The method may include (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data and/or AVSF data from a mobile device associated with a vehicle owner or a vehicle controller or transceiver; and/or (4) analyzing, via the one or more processors, the vehicle telematics data and/or AVSF data to determine an individual AVSF performance rating or safety score for each AVSF defined by the ontology or ontology model. The method may include additional, fewer, or alternate actions, including those discussed elsewhere herein.

For instance, the method may include generating a virtual report detailing the individual AVSF performance rating or safety score for each AVSF in or defined by the ontology. The method may also include publishing the virtual report or otherwise making the virtual report available via a virtual portal.

In some embodiments, the AVSF data may be AVSF configuration, software, and/or usage data. Additionally or alternatively, the AVSF data may include or detail vehicle owner preferences for AVSF configurations and usage. The AVSF data may include software version information of a current software version installed or executing on the AVSF. The AVSF may be an autonomous or semi-autonomous vehicle feature, technology, or system.

The vehicle telematics data may include speed, acceleration, cornering, braking, location, and time of day information. Analyzing, via the one or more processors, the vehicle telematics data and/or AVSF data to determine an individual AVSF performance rating or safety score may include inputting the vehicle telematics data and/or AVSF data into a machine learning program, module, model, or algorithm trained to generate an AVSF performance rating or safety score based upon vehicle telematics data and/or AVSF data.

In another aspect, a computer system configured to determine the effectiveness of vehicle safety features may be provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data and/or AVSF data from a mobile device associated with a vehicle owner or a vehicle controller or transceiver; and/or (4) analyze the vehicle telematics data and/or AVSF data to determine an individual AVSF performance rating or safety score for each AVSF defined by the ontology or ontology score.

The one or more processors may be further configured to generate a virtual report detailing the individual AVSF performance rating or safety score for each AVSF in or defined by the ontology. The one or more processors may be configured to input the vehicle telematics data and/or AVSF data into a machine learning program, module, model, or algorithm trained to generate an AVSF performance rating or safety score based upon vehicle telematics data and/or AVSF data. The computer system may include additional, less, or alternate functionality, including that discussed elsewhere herein.

In another aspect, a computer-implemented method for determining the effectiveness of vehicle safety features may be provided. The method may include (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data associated with a vehicle collision and/or AVSF data associated with the vehicle collision, such as from a mobile device associated with a vehicle owner or a vehicle controller or transceiver; and/or (4) analyzing, via the one or more processors, the vehicle telematics data associated with the vehicle collision and/or AVSF data associated with the vehicle collision to determine an individual AVSF performance rating or safety score for each AVSF defined by the ontology or ontology model.

The method may include generating a virtual report detailing the individual AVSF performance rating or safety score for each AVSF in or defined by the ontology. The method may include inputting the vehicle telematics data associated with the vehicle collision and/or AVSF data associated with the vehicle collision into a machine learning program, module, model, or algorithm trained to generate an AVSF performance rating or safety score based upon vehicle telematics data and/or AVSF data. The vehicle telematics data and/or AVSF data may be generated or collected before, during, and/or after a vehicle collision. The method may include additional, fewer, or alternate actions, including those discussed elsewhere herein.

In another aspect, a computer system configured to determine the effectiveness of vehicle safety features may be provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data associated with the vehicle collision and/or AVSF data associated with the vehicle collision, such as from a mobile device associated with a vehicle owner or a vehicle controller or transceiver; and/or (4) analyze the vehicle telematics data associated with the vehicle collision and/or AVSF data associated with the vehicle collision to determine an individual AVSF performance rating or safety score. The computer system may be configured to input the vehicle telematics data and/or AVSF data into a machine learning program, module, model, or algorithm trained to generate an AVSF performance rating or safety score based upon vehicle telematics data and/or AVSF data. The computer system may include additional, less, or alternate functionality, including that discussed elsewhere herein.

Exemplary System for Constructing a Vehicle Data Repository

Currently, many companies and governmental organizations collect vehicle data. However, the vehicle data is difficult to aggregate because, among other things, the various vehicle databases store different kinds of vehicle data, label substantially the same vehicle feature or part differently, and/or include different levels of detail in the data. Thus, what is needed is a system that can aggregate vehicle data from different databases while overcoming these obstacles and others.

Such a system is provided in the example of FIG. 7, which illustrates an exemplary computer system 700 for constructing a vehicle data repository 740, in accordance with some embodiments. The high-level architecture illustrated in FIG. 7 may include both hardware and software applications, as well as various data communications channels for communicating data between the various hardware and software components, as is described below. The system may include a computing device 102, VBI database 135, and network 104, as described above (e.g., as described with respect to FIG. 1). In this respect, in some embodiments, the example of FIG. 7 is an extension of the example of FIG. 1.

The system may include a vehicle data repository (VDR) computing device 702 configured to communicate, e.g., via a network 104 (which may be a wired or wireless network), with data source servers 760A, 760B, 760C associated with various data sources. Although three data source servers 760A, 760B, 760C associated with three separate data sources are shown in FIG. 7, a greater or lesser number of data source servers may be included in various embodiments. The data source servers 760A, 760B, 760C may each respectively be associated with data source databases 750A, 750B, 750C storing, inter alia, vehicle information (e.g., year/make/model of the vehicle, safety feature information, accident history information, ownership information, etc.). In some embodiments, the data source databases 750A, 750B, 750C correspond to a National Highway Traffic Safety Administration (NHTSA) information database, a Highway Loss Data Institute (HLDI) information database, and/or an Insurance Institute for Highway Safety (IIHS) database.

Furthermore the data source servers 760A, 760B, 760C may each respectively include one or more processors 762A, 762B, 762C, such as one or more microprocessors, controllers, and/or any other suitable type of processor. The data source servers 760A, 760B, 760C may each respectively further include a memory 764A, 764B, 764C (e.g., volatile memory, non-volatile memory) accessible by the respective one or more processors 762A, 762B, 762C, (e.g., via a memory controller). The respective one or more processors 762A, 762B, 762C may each interact with the respective memories 764A, 764B, 764C to obtain, for example, computer-readable instructions stored in the respective memories 764A, 764B, 764C. Additionally or alternatively, computer-readable instructions may be stored on one or more removable media (e.g., a compact disc, a digital versatile disc, removable flash memory, etc.) that may be coupled to the data source servers 760A, 760B, 760C to provide access to the computer-readable instructions stored thereon. In particular, the computer-readable instructions stored on the respective memories 764A, 764B, 764C may include instructions for transmitting vehicle build information from the respective data source databases 750A, 750B, 750C to the computing device 102 (e.g., via the network 104).

Furthermore, the VDR computing device 702 may include one or more processors 720 such as one or more microprocessors, controllers, and/or any other suitable type of processor. The VDR computing device 702 may further include a memory 722 (e.g., volatile memory, non-volatile memory) accessible by the one or more processors 720, (e.g., via a memory controller). Additionally, the computing device may include a user interface 723.

The one or more processors 720 may interact with the memory 722 to obtain, for example, computer-readable instructions stored in the memory 722. Additionally or alternatively, computer-readable instructions may be stored on one or more removable media (e.g., a compact disc, a digital versatile disc, removable flash memory, etc.) that may be coupled to the computing device 702 to provide access to the computer-readable instructions stored thereon. In particular, the computer-readable instructions stored on the memory 722 may include instructions for executing various applications, such as, e.g., a machine learning model training application 724, an ontology generator 726, vehicle build information translator 728, and/or a standardized build sheet constructor 731.

In general, the VDR computing device 702 may build the VDR 740 by constructing standardized build sheets by taking vehicle data from the data source databases 750A, 750B, 750C. In this regard, FIG. 8B shows an example of standardized build sheet fields 850. For instance, the fields of a standardized build sheet may include: a vehicle identification number (VIN); vehicle make; vehicle model; vehicle model year; vehicle trim; vehicle drivetrain; vehicle body type; vehicle fuel type; vehicle number of engine cylinders; base manufacturer's suggested retail price (MSRP); MSRP; vehicle engine layout; vehicle engine capacity; vehicle engine horsepower (HP); vehicle transmission type; vehicle transmission speeds; vehicle wheelbase; vehicle curb weight; gross vehicle minimum weight; gross vehicle weight maximum; vehicle length; vehicle width; vehicle height; truck bed length; tire wheel diameter; tire aspect ratio; tire width tire construction; presence of adaptive cruise control; presence of adaptive cruise control with stop; presence of backup camera; presence of blind spot warning; presence of blind spot prevention; presence of automatic high beams; presence of adaptive headlights curve; presence of adaptive headlights distance; presence of adaptive driving beams; presence of forward collision warning; presence of forward collision warning with automatic emergency breaking (AEB); and/or presence of forward collision warning with AEB and pedestrian detection. In some embodiments, a VIN in a VIN field is used as the identifier of the standardized build sheet.

Additionally or alternatively, the fields of the standardized vehicle build sheet may also include accident information of the vehicle. The accident information may include, for instance, a speed at which a vehicle was traveling at when an accident occurred; a portion of a vehicle impacted by the accident; and/or weather conditions during the accident.

To construct the standardized build sheets, the VDR computing device 702 may include standardized build sheet constructor 731. The standardized build sheet constructor 731 may fill the fields of the standardized build sheets based upon selections of data from the VBI database 135, and/or the data source databases 750A, 750B, 750C. To this end, the standardized build sheet constructor 731 may make a determination of a best source for the information for each of the fields based upon reliability and detail of each of the respective data sources.

Advantageously, to help the standardized build sheet constructor 731 make better selections of data to fill the fields of the standardized built sheet, the VDR computing device 702 may also create a common ontology between any or all of terms of the VBI database 135, and/or the data source databases 750A, 750B, 750C. To this end, the VDR computing device 702 may include ontology generator 726. The ontology generator 726 may apply a trained machine learning model to the vehicle build information from the respective data sources (e.g., the VBI database 135, the data source databases 750A, 750B, 750C, and/or any other data sources) in order to generate an ontology model mapping similar or same terms between each of the respective data sources. For instance, different terms describing the same part in each of the respective data sources may be mapped together.

The vehicle build information translator 728 may apply the ontology model to the vehicle build information from the VBI database 135, and/or the data source databases 750A, 750B, 750C to translate the vehicle build information each of the different data sources into the common language (i.e., by translating data source-specific terminology to data source-agnostic terminology).

The machine learning model applied by the ontology generator 726 may be trained by the machine learning training application 724. In particular, the machine learning training application 724 may train the machine learning model to group similar terminology from different data sources, e.g., based upon similarities between descriptions of each term and/or based upon similarities between the terms themselves, using several known data source-specific terms from each of a plurality of data sources.

In general, training the machine learning model may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

Figure 8A:
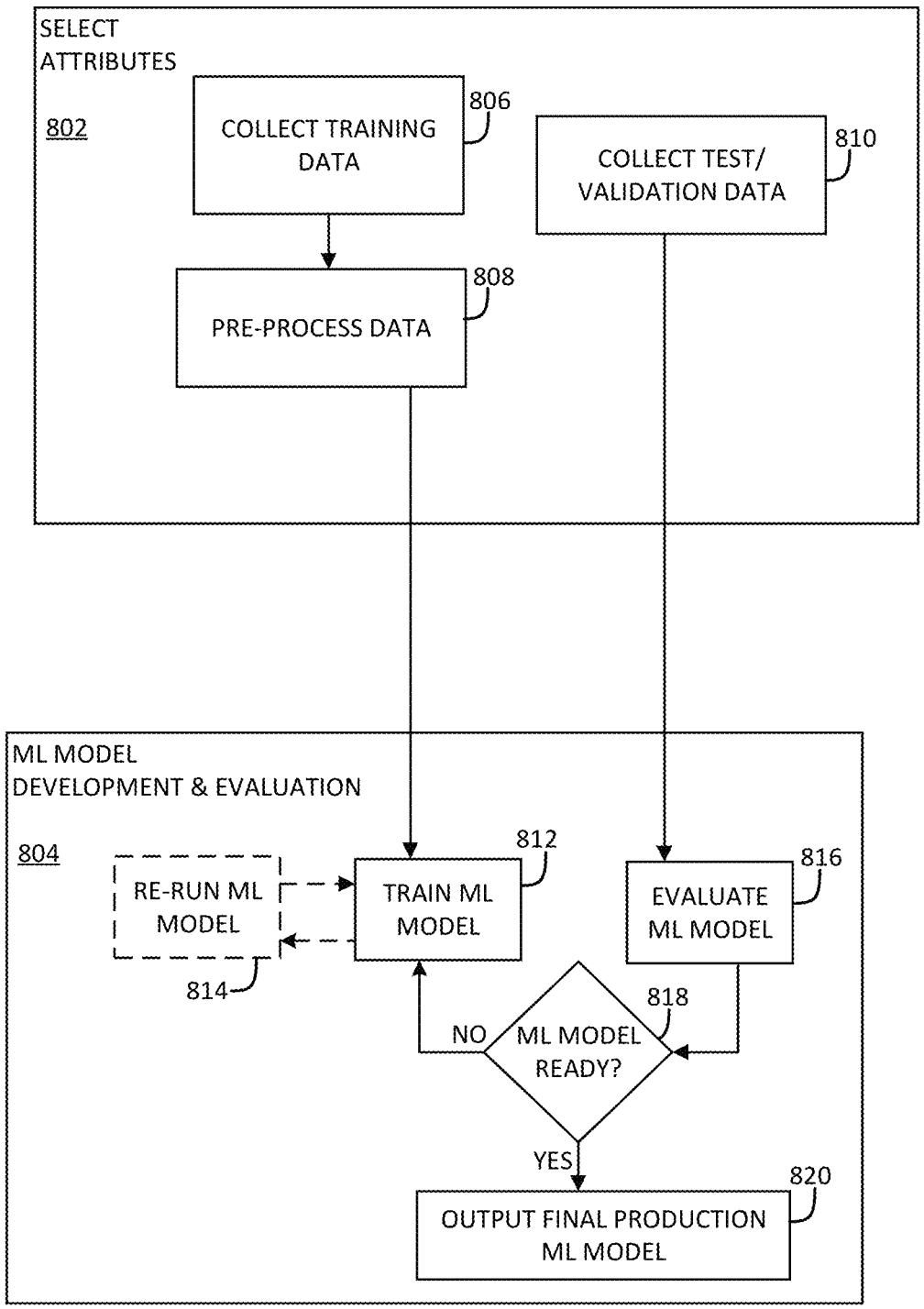
FIG. 8A illustrates an example of training a machine learning algorithm, in accordance with some embodiments.

FIG. 8A is a block diagram of an example machine learning modeling method 800 for training and evaluating a machine learning model (e.g., a machine learning algorithm), in accordance with various embodiments. It should be understood that the principles of FIG. 8A may apply to any machine learning algorithm discussed herein. As will be discussed further below, in some embodiments, the machine learning model may be used to create ontology models; in other embodiments, the machine learning model may be used to select data to fill a standardized build sheet, such as that as in the example of FIG. 8B.

In some embodiments, the model "learns" an algorithm capable of creating an ontology and/or to select information to fill fields of a standardized build sheet. For instance, to fill fields of the standardized build sheet, the machine learning algorithm may select from information between the VBI database 130 and/or any of the data source data bases 750A, 750B, 750C.

At a high level, the machine learning modeling method 800 includes a block 802 for preparation of model input data, and a block 804 for model training and evaluation. The model training, storage, and implementation may be performed at the VDR computing device 702 or any other suitable component. In some embodiments, the training, storage, and implementation steps of the machine learning model may be performed at different computing devices or servers. For example, the machine learning model may be trained at any of the VDR computing device 702, the computing device 102 and/or the data source servers 760A, 760B, 760C; the machine learning model may then be stored and implemented at any of the VDR computing device 702, the computing device 102, and/or the data source servers 760A, 760B, 760C.

Depending on implementation, one or more machine learning models may be trained at the same time. The different trained models may be further operated separately or in conjunction. Specific attributes in the training data sets may determine for which particular model each data set will be used. The determination may be made on attributes such as specific features of the information from the computing device 102 and/or any of the data source servers 760A, 760B, 760C. Training multiple models may provide an advantage of expediting calculations and further increasing specificity of prediction for each model's particular instance space.

Depending on implementation, the machine learning model may be trained based upon supervised learning, unsupervised learning, or semi-supervised learning. Such learning paradigms may include reinforcement learning. Supervised learning is a learning process for learning the underlying function or algorithm that maps an input to an output based on example input-output combinations. A "teaching process" compares predictions by the model to known answers (labeled data) and makes corrections in the model. The trained algorithm is then able to make predictions of outputs based on the inputs. In such embodiments, the data (e.g., terminology data including terms for vehicle features or parts, or data corresponding to the standardized build sheet fields 850) may be labeled according to the corresponding output (e.g., a known common terminology, or known answer about what information is best to select for the standardized build sheet, etc.).

Unsupervised learning is a learning process for generalizing the underlying structure or distribution in unlabeled data. In embodiments utilizing unsupervised learning, the system may rely on unlabeled vehicle parts data, information corresponding to standardized build sheet fields 850, or some combination thereof. During unsupervised learning, natural structures are identified and exploited for relating instances to each other. Semi-supervised learning can use a mixture of supervised and unsupervised techniques. This learning process discovers and learns the structure in the input variables, where typically some of the input data is labeled, and most is unlabeled. The training operations discussed herein may rely on any one or more of supervised, unsupervised, or semi-supervised learning with regard to the order data and delivery data, depending on the embodiment.

Block 802 may include any one or more blocks or sub-blocks 806-810, which may be implemented in any suitable order. At block 806, the machine learning training application 724, executed by processor 720 according to instructions on program memory 722, may obtain training data from the computing device 102 and/or any of the data source servers 760A, 760B, 760C. For implementations training a machine learning algorithm to select information for a standardized build sheet, the training data may include terms from OEM build sheets (in OEM-agnostic terminology and/or OEM specific terminology), information from a second data source (e.g., data source servers 760A, 760B, 760C, etc.), and/or any other suitable source. For implementations training a machine learning algorithm to identify OEM-specific terminology, the training data may include OEM-specific terms and/or OEM-agnostic terms. For implementations training a machine learning algorithm to identify secondary source-specific terminology, the training data may include data from any build sheet (e.g., from any of a NHTSA database, a HLDI database, a IIHS database, etc.).

Initially, at block 808, relevant data may be selected from among available data (e.g., historical data). Training data may be assessed and cleaned, including handling missing data and handling outliers. For example, missing records, zero values (e.g., values that were not recorded), incomplete data sets (e.g., for scenarios when data collection was not completed), outliers, and inconclusive data may be removed. In order to select high predictive value features, special feature engineering techniques may be used to derive useful features from the datasets. For example, data may be visualized for the underlying relationships to determine which feature engineering steps should be assessed for performance improvement. This step may include manually entering user input, for example via user interface 723, which may include defining possible predictive variables for the machine learning model. Manual user input may also include manually including or excluding variables selection after running special feature engineering techniques. Manual user input may be guided by an interest to evaluate, for example, an interaction of two or more predictor variables (e.g., which data source the data came from).

Furthermore, at block 808, various measures may be taken to ensure a robust set of training data (e.g., providing standardized, heterogeneous data, removing outliers, imputing missing values, and so on). In certain embodiments, special feature engineering techniques may be used to extract or derive the best representations of the predictor variables to increase the effectiveness of the model. To avoid overfitting, in some embodiments feature reduction may be performed. In some embodiments, feature engineering techniques may include an analysis to remove uncorrelated features or variables. Variables may be evaluated in isolation to eliminate low predictive value variables, for example, by applying a cut-off value.

At block 810, the machine learning training application 724 receives test data for testing the model or validation data for validating the model (e.g., from one of the described respective data sources). Some or all of the training, test, or validation data sets may be labeled with pre-determined answers (e.g., based upon a desired common terminology, or known answer about what information is best to select for the standardized build sheet, etc.).

Block 804 illustrates an example machine learning (ML) model development and evaluation phase. Block 804 may include any one or more blocks or sub-blocks 812-820, which may be implemented in any suitable order. In one example, at block 812, the training module trains the machine learning model by running one or more pre-processed training data sets described above. At block 814, the training module re-runs several iterations of the machine learning model. At block 816, the training module evaluates the machine learning model, at block 818 the training module determines whether or not the machine learning model is ready for deployment before either proceeding to block 820 to output final production model or returning to block 812 to further develop, test, or validate the model.

Regarding block 812, developing the model typically involves training the model using training data. At a high level, the machine learning model may be utilized to discover relationships between various observable features (e.g., between predictor features and target features) in a training dataset, which can then be applied to an input dataset to predict unknown values for one or more of these features given the known values for the remaining features. At block 804, these relationships are discovered by feeding the model pre-processed training data including instances each having one or more predictor feature values and one or more target feature values. The model then "learns" an algorithm capable of calculating or predicting the target feature values (e.g., to select information for the standardized build sheet, or to build a common ontology) given the predictor feature values.

At block 812, the machine learning model may be trained (e.g., by the VDR computing device 702) to thereby generate the machine learning model. Techniques for training/generating the machine learning model may include gradient boosting, neural networks, deep learning, linear regression, polynomial regression, logistic regression, support vector machines, decision trees, random forests, nearest neighbors, or any other suitable machine learning technique. In some examples, VDR computing device 702 implements gradient boosting machine learning (for example, using the open source extreme gradient boosting (XGBoost) algorithm) with a secondary application of the model for close cases and/or error correction. In certain embodiments, training the machine learning model may include training more than one model according to the selected method(s) on the data pre-processed at block 808 implementing different method(s) and/or using different sub-sets of the training data, or according to other criteria.

Training the machine learning model may include re-running the model (at optional block 814) to improve the accuracy of prediction values. For example, re-running the model may improve model training when implementing gradient boosting machine learning. In another implementation, re-running the model may be necessary to assess the differences caused by an evaluation procedure. For instance, available data sets in the vehicle accident records database 136, the computing device 102, any of the data source servers 760A, 760B, 760C, and/or any other data source may be split into training and testing data sets by randomly assigning sub-sets of data to be used to train the model or evaluate the model to meet the predefined train or test set size, or an evaluation procedure may use a k-fold cross validation. Both of these evaluation procedures are stochastic, and, as such, each evaluation of a deterministic ML model, even when running the same algorithm, provides a different estimate of error or accuracy. The performance of these different model runs may be compared using one or more accuracy metrics, for example, as a distribution with mean expected error or accuracy and a standard deviation. In certain implementations, the models may be evaluated using metrics such as root mean square error (RMSE), to measure the accuracy of prediction values.

Regarding block 816, evaluating the model typically involves testing the model using testing data or validating the model using validation data. Testing/validation data typically includes both predictor feature values and target feature values (e.g., including order demand patterns for which corresponding delivery patterns are known), enabling comparison of target feature values predicted by the model to the actual target feature values, enabling one to evaluate the performance of the model. This testing/validation process is valuable because the model, when implemented, will generate target feature values for future input data that may not be easily checked or validated. Thus, it is advantageous to check one or more accuracy metrics of the model on data for which the target answer is already known (e.g., testing data or validation data), and use this assessment as a proxy for predictive accuracy on future data. Example accuracy metrics include key performance indicators, comparisons between historical trends and predictions of results, cross-validation with subject matter experts, comparisons between predicted results and actual results, etc.

Regarding block 818, the processor 720 may utilize any suitable set of metrics to determine whether or not to proceed to block 820 to output the final production model. Generally speaking, the decision to proceed to block 820 or to return to block 812 will depend on one or more accuracy metrics generated during evaluation (block 816). After the sub-blocks 812-818 of block 804 have been completed, the processor 720 may implement block 820. At block 820, the machine learning model is output.

Returning now to FIG. 7, the search application 732 may provide a search feature to be displayed to a user via, e.g., via a web interface or via the user interface 723. In one example, the search application 732 may receive user input indicating a vehicle identification number (VIN) to be searched, and may search the vehicle build information to locate a matching vehicle and its associated standardized build sheet to thereby display the associated information (e.g., from the fields of the standardized build sheet). Accordingly, the search application 732 may cause the user interface 723 to display, based upon the user input, a listing of vehicle features, accident history information, and/or any other information associated with the VIN. As another example, the search application 732 may receive user input indicating a search term to be searched, and may cause the user interface 723 to display, based upon the user input, a listing of vehicles based upon the search term. In some examples, the user may use any terminology (e.g., data source-specific terminology or data source-agnostic terminology) for the feature, and the ontology model may be used to translate the user's input into data source-agnostic terminology for the feature. Accordingly, the search application 732 may search the vehicle build information using the data source-agnostic terminology and locate results to be displayed to the user. In some embodiments where the standardized build sheet includes insurance claim information, a user may input insurance claim information (e.g., an insurance claim number), which the search application 732 will use to search and display results to the user.

Exemplary Methods for Constructing a Vehicle Data Repository

Figure 9:
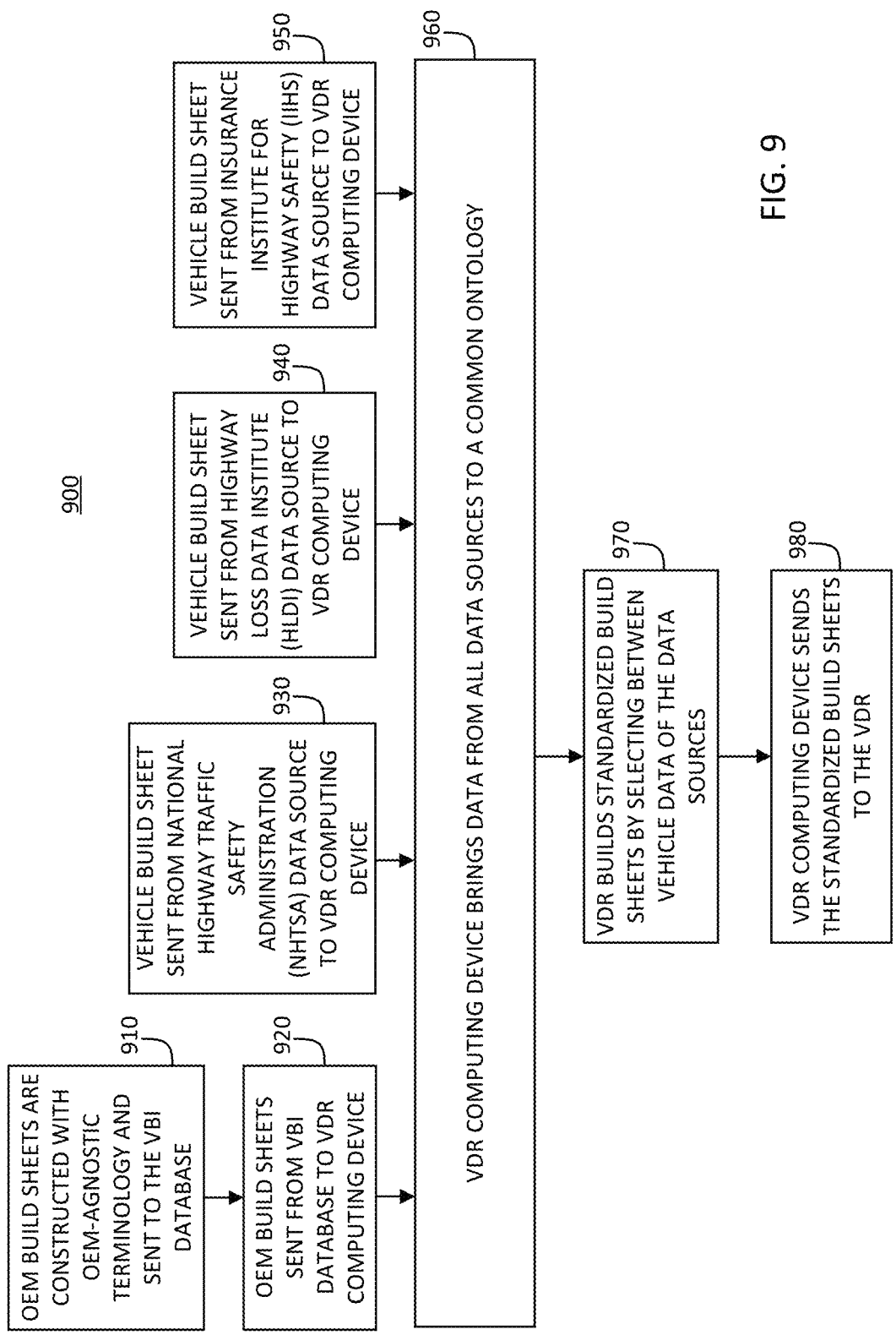
FIG. 9 illustrates an example implementation of constructing a vehicle data repository (VDR)

Broadly speaking, the VDR computing device 702 may populate the fields of the standardized build sheet by selecting data from the data source servers 760A, 760B, 760C. To this end, FIG. 9 shows an example implementation 900 of constructing a VDR including selecting between vehicle data of the data sources. The example implementation begins at block 910 where OEM build sheets are constructed by the computing device 102. The OEM build sheets may be constructed according to any suitable technique, including the techniques described above (e.g., according to the techniques in the examples of FIGS. 4-6, etc.). Advantageously, in some embodiments, the OEM build sheets may be constructed according to an OEM-agnostic terminology. As described above, the OEM-agnostic terminology allows for common features (e.g., safety features) and vehicle parts to be evaluated, even if their original OEM-specific terminology is different. Moreover, the OEM-agnostic terminology may be leveraged to provide a common terminology for any type of information. For instance, OEM-agnostic terms may be used for vehicle parts.

At block 920, the OEM build sheets are sent from the VBI database 135 to the VDR computing device 702. At blocks 930, 940, and 950 additional vehicle information is sent to the VDR computing device 702. In particular, a National Highway Traffic Safety Administration (NHTSA) data source sends a vehicle build sheet (block 930); a Highway Loss Data Institute (HLDI) data source sends a vehicle build sheet (block 940); and an Insurance Institute for Highway Safety (IIHS) data source sends a vehicle build sheet (block 950). In this way, in the example implementation of FIG. 9, the NHTSA data source, the HLDI data source, and the IIHS data source correspond to the data source databases 750A, 750B, 750C of FIG. 7. It should be understood that the VDR computing device 702 may receive the OEM build sheets and/or vehicle build sheets in any order.

At block 960, the VDR computing device 702 brings the data received from all of the data sources to a common ontology. The common ontology creates a mapping between all of the OEM build sheets, the NHTSA data source, the HLDI data source, the IIHS data source (e.g., databases 750A, 750B, 750C) and the standardized build sheet. The common ontology may convert the different terminology from the OEM build sheets, the NHTSA data source, the HLDI data source, the IIHS data source and the standardized build sheet into a common vocabulary.

In some examples, the common ontology is created using a machine learning model (e.g., as in the example of FIG. 8A), which may be trained using data source-specific and/or standardized build sheet-specific terminology associated with each of a plurality of known data sources and the standardized build sheet. For instance, machine learning or natural language processing may be used to group similar terminology from different data sources and the standardized build sheet, e.g., based upon similarities between descriptions of each term and/or based upon similarities between the terms themselves. The trained machine learning model may be applied to the obtained vehicle build information in order to identify specific terminology associated with vehicle features, vehicle parts, etc.

The machine learning model may be of any suitable kind. For instance, the machine learning model may be any of a gradient boosting machine learning algorithm (e.g., XGBoost), a neural network, a deep learning algorithm, a regression technique, etc.

Furthermore, once the common ontology has been made and applied to the received data, the VDR computing device 702 may bring any or all of the received data to a common level of detail. For instance, if data from a data source has too much detail from a data source (e.g., for entry into the standardized build sheet), the data may be extrapolated up. For example, if the data from a data source for a particular part includes a color of the particular part as light blue, the color may be extrapolated up to blue. Additionally or alternatively, if the data from any of the data sources does not include enough detail, the data may be predicted down to include additional detail. For instance, data provided to the VDR computing device 702 may include a specific package of features that a vehicle is equipped with, and the specific package of features may be broken out into individual features.

At block 970, the VDR computing device 702 constructs the standardized build sheets by selecting between the vehicle data of the data sources to fill the fields of the standardized vehicle build sheet (e.g., any or all of the fields illustrated in the example of FIG. 8B). For instance, the VDR computing device 702 may select between the vehicle data based upon a determination of a best source for the information for each of the fields based upon reliability and detail of each of the respective data sources. In this regard, in some implementations, for fields where comparisons between data sources can be made, a subsequent field (e.g., of the standardized build sheet) may be populated to indicate whether or not a discrepancy exists across the data sources. This may or may not then be used to generate a level of confidence for the chosen value (e.g., if data sources agree, then there may be a higher level of confidence placed on the value; whereas, if data sources disagree on the value, then a lower level of confidence may be placed on the accuracy of the chosen value).

At block 980, the VDR computing device 702 sends the constructed standardized build sheets to the VDR 740, thereby building the VDR 740. The standardized build sheets may be stored for later use, as discussed further herein. It should be understood that the example method 900 may include additional, fewer, or alternate actions, including those discussed elsewhere herein.

Figure 10:
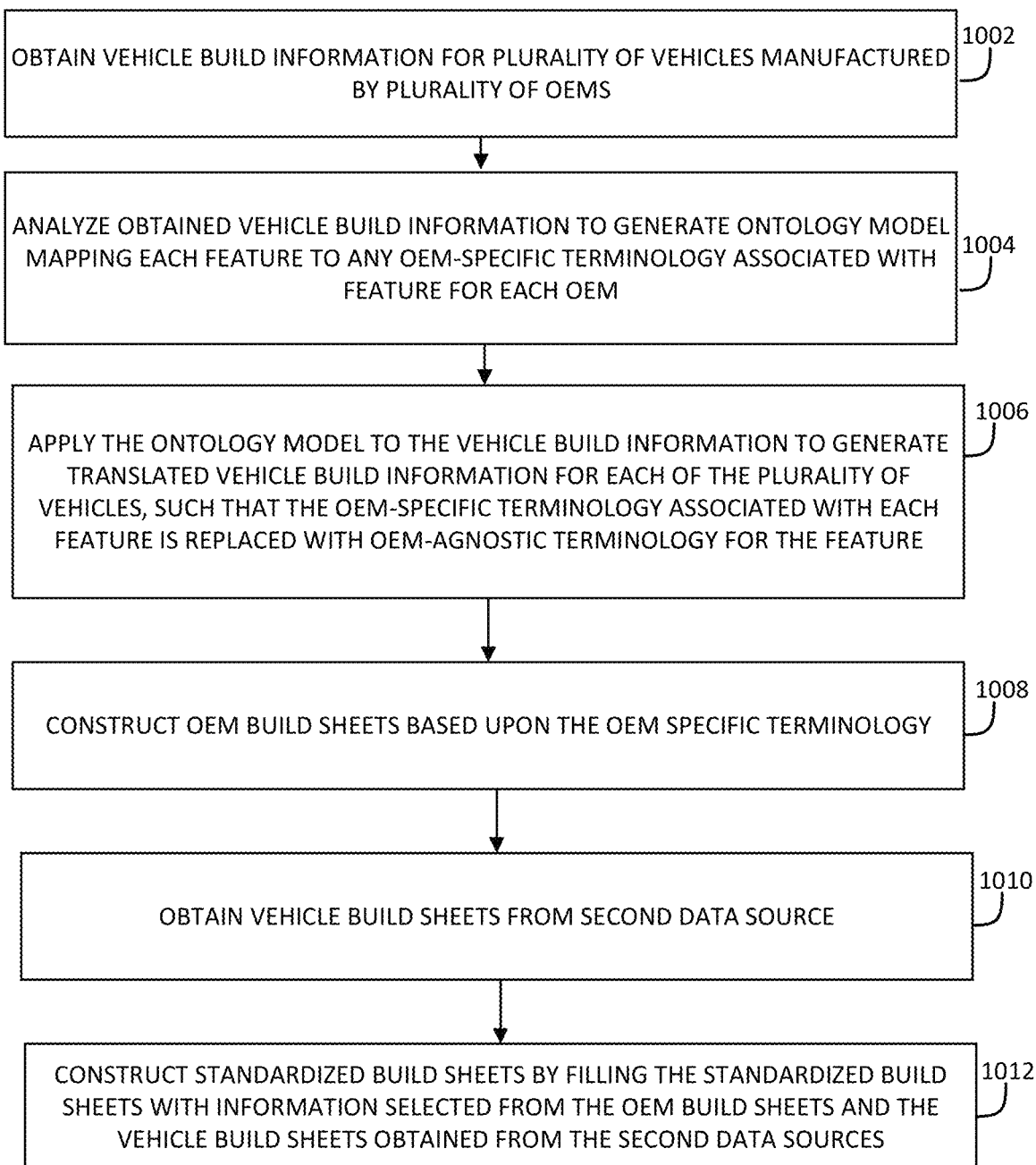
FIG. 10 illustrates an exemplary computer-implemented method of building a vehicle data repository, including first constructing OEM build sheets, and second selecting between information from an OEM build sheet and information from a second data source.

FIG. 10 illustrates a flow diagram of an exemplary computer-implemented method 1000 for building a vehicle data repository, including first constructing OEM build sheets, and second selecting between information from an OEM build sheet and information from a second data source, in accordance with some embodiments. One or more steps of the method 1000 may be implemented as a set of instructions stored on a computer-readable memory and executable on one or more processors. It should be understood that the exemplary computer-implemented method 1000 may include additional, fewer, or alternate actions, including those discussed elsewhere herein.

At block 1002, vehicle build information for a plurality of vehicles manufactured by a plurality of OEMs may be obtained, e.g., from databases associated with each OEM. For example, the vehicle build information obtained from each OEM may include information from vehicle build sheets for each individual vehicle manufactured by that OEM, with each vehicle build sheet listing all features of the individual vehicle.

The vehicle build information may contain, for instance OEM-specific terminology associated with one or more features associated with each vehicle. For instance, the features may be smart safety features. In one example of this, a first OEM may use the terminology "lane change assist" for a blind spot detection smart safety feature, while a second OEM may use the terminology "blind spot info system," and a third OEM may use the terminology "blind spot monitor," for essentially the same blind spot detection smart safety feature. As another example, a first OEM may use the terminology "adaptive cruise assist" for an adaptive cruise control feature, while a second OEM may use the terminology "predictive cruise control," and a third OEM may use the terminology "active cruise control," for essentially the same adaptive cruise control feature. Consequently, in some examples, vehicle build sheets for vehicles manufactured by different OEMs may each have different OEM-specific terminology for the essentially the same smart safety features.

The obtained vehicle build information may be analyzed (block 1004) by a processor to generate an ontology model mapping each feature (or smart safety feature) to any OEM-specific terminology associated with the feature for each OEM. For instance, the ontology model may map the OEM-specific terms: "lane change assist," "blind spot info system," and "blind spot monitor" to the smart safety feature of blind spot detection. As another example, the ontology model may map "adaptive cruise assist," "predictive cruise control," and "active cruise control," to the smart safety feature of adaptive cruise control.

In some examples, a machine learning model may be trained (e.g., as in the example of FIG. 8A) using OEM-specific terminology associated with each of a plurality of known features for a plurality of OEMs. For instance, machine learning or natural language processing may be used to group similar terminology from different OEMs, e.g., based upon similarities between descriptions of each term and/or based upon similarities between the terms themselves. The trained machine learning model may be applied to the obtained vehicle build information in order to identify OEM-specific terminology associated with each feature for each OEM.

The ontology model may be applied (block 1006) to the vehicle build information to generate translated vehicle build information for each of the plurality of vehicles, such that the OEM-specific terminology associated with each feature is replaced with OEM-agnostic terminology for the feature. For instance, wherever OEM-specific terms such as "the OEM-specific terms: "lane change assist," "blind spot info system," and "blind spot monitor" appear in the vehicle build information for each of the plurality of vehicles, these terms may be replaced with an OEM-agnostic term (e.g., "blind spot detection feature"). Similarly, wherever OEM-specific terms such as "adaptive cruise assist," "predictive cruise control," and "active cruise control," appear in the vehicle build information for each of the plurality of vehicles, these terms may be replaced with an OEM-agnostic term (e.g., "adaptive cruise control feature"). Accordingly, the terminology used in the vehicle build information associated with each vehicle may be standardized such that the vehicle build information for each of the plurality of vehicles uses the same OEM-agnostic terminology when referring to features that are the same or essentially the same.

At block 1008, OEM build sheets are constructed using the OEM-agnostic terminology. The OEM build sheets may be constructed using any suitable technique, including those described above.

At block 1010, the VDR computing device 702 receives vehicle build sheets from second data sources (e.g., the data source databases 750A, 750B, 750C). In some embodiments, the second data sources may be databases of NHTSA, HLDI, and/or IIHS.

At block 1012, the VDR computing device 702 constructs the standardized build sheets by selecting information from the OEM build sheets and/or the build sheets obtained from the second data sources. In some embodiments, the information is selected from the OEM build sheet and the vehicle build sheet based upon a determination of a best source for the information for each of the fields based upon reliability and detail of each of the respective data sources.

In some implementations, the information is selected using a trained machine learning model. The machine learning model may be of any suitable kind. For instance, the machine learning model may be any of a gradient boosting machine learning algorithm (e.g., XGBoost), a neural network, a deep learning algorithm, a regression technique, etc. In one example, the machine learning algorithm may be created as in the example of FIG. 8A.

In some variations, as part of the selecting of the information, the VDR computing device 702 may bring any or all of the received data to a common level of detail. For instance, if data from a data source has too much detail from a data source (e.g., for entry into the standardized build sheet), the data may be extrapolated up. For example, if the data from a data source for a particular part includes a color of the particular part as light blue, the color may be extrapolated up to blue. Additionally or alternatively, if the data from any of the data sources does not include enough detail, the data may be predicted down to include additional detail.

However constructed, the standardized build sheets may then be added to the VDR 740 to build the VDR 740. In some embodiments, the VDR computing device 702 may also determine an insurance rating and/or risk rating for a particular vehicle based upon an effectiveness score associated with each feature associated with a particular vehicle. The insurance rating and/or risk rating may then be displayed to a user via, e.g., via a web interface or via the user interface 723.

Figure 11:
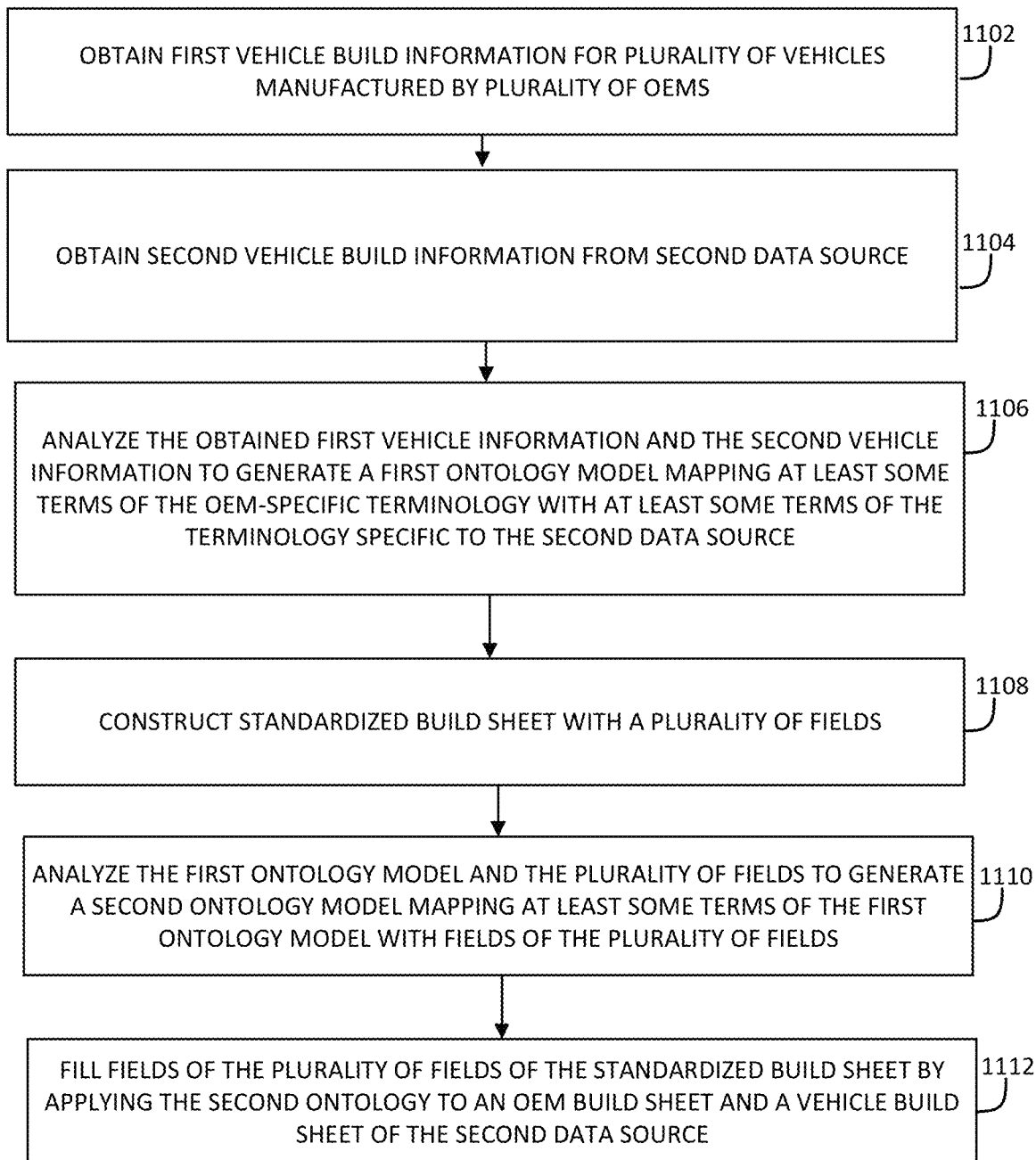
FIG. 11 illustrates an exemplary computer-implemented method of building a vehicle data repository, including first creating a common ontology mapping between first and second data sources, and subsequently, creating a second ontology mapping between the first ontology model and the fields of the standardized build sheet.

FIG. 11 illustrates a flow diagram of an exemplary computer-implemented method 1100 for building a vehicle data repository, including first creating a common ontology mapping between first and second data sources, and subsequently, creating a second ontology mapping between the first ontology model and the fields of the standardized build sheet. One or more steps of the method 1100 may be implemented as a set of instructions stored on a computer-readable memory and executable on one or more processors. It should be understood that the exemplary computer-implemented method 1100 may include additional, fewer, or alternate actions, including those discussed elsewhere herein.

At block 1102, first vehicle build information for a plurality of vehicles manufactured by a plurality of OEMs may be obtained, e.g., from databases associated with each OEM. For example, the first vehicle build information obtained from each OEM may include information from vehicle build sheets for each individual vehicle manufactured by that OEM, with each vehicle build sheet listing all features of the individual vehicle.

At block 1104, second vehicle build information for a plurality of vehicles may be obtained from second data sources, e.g., from data source databases 750A, 750B, 750C. For example, the second vehicle build information obtained from the second data sources may include information from vehicle build sheets for each individual vehicle, with each vehicle build sheet listing all features of the individual vehicle. The second vehicle information may also include accident history of the vehicle.

At block 1106, the obtained first vehicle information and the second vehicle information may be analyzed to generate a first ontology model mapping at least some terms of the OEM-specific terminology with at least some terms of the terminology specific to the second data source. In some embodiments, the first ontology model is generated using a machine learning technique, such as any of those described elsewhere herein (e.g., as described in the example of FIG. 8A, etc.).

At block 1108, a standardized build sheet is constructed. The standardized build sheet may include a plurality of fields, such as the plurality of fields illustrated in the example of FIG. 8B. In some embodiments, when the standardized datasheet is constructed, the plurality of fields are blank. In other embodiments, when the standardized datasheet is constructed, some or all of the plurality of fields are filled with default data.

At block 1110, the first ontology model and the plurality of fields of the standardized vehicle build sheet are analyzed to generate a second ontology model mapping at least some terms of the first ontology model with fields of the plurality of fields. In some implementations, the second ontology may be created using a machine learning algorithm. The machine learning model may be of any suitable kind. For instance, the machine learning model may be any of a gradient boosting machine learning algorithm (e.g., XGBoost), a neural network, a deep learning algorithm, a regression technique, etc. In some embodiments, the machine learning algorithm may be trained as in the example of FIG. 8A.

At block 1112, fields of the plurality of fields of the standardized build sheet are filled by applying the second ontology to an OEM build sheet and a vehicle build sheet of the second data source. In some embodiments, the fields of the plurality of fields are also filled based upon selections between data from the first vehicle build information, and data from the second vehicle build information. For example, the fields may be filled based upon a determination of a best source for the information for each of the fields based upon reliability and detail of each of the respective data sources. In some embodiments, the information may be selected using a machine learning algorithm. The machine learning model may be of any suitable kind. For instance, the machine learning model may be any of a gradient boosting machine learning algorithm (e.g., XGBoost), a neural network, a deep learning algorithm, a regression technique, etc. In some embodiments, the machine learning algorithm may be trained as in the example of FIG. 8A.

In some embodiments, the VDR computing device 702 may also determine an insurance rating and/or risk rating for a particular vehicle based upon an effectiveness score associated with each feature associated with a particular vehicle. The insurance rating and/or risk rating may then be displayed to a user via, e.g., via a web interface or via the user interface 723.

Figure 12:
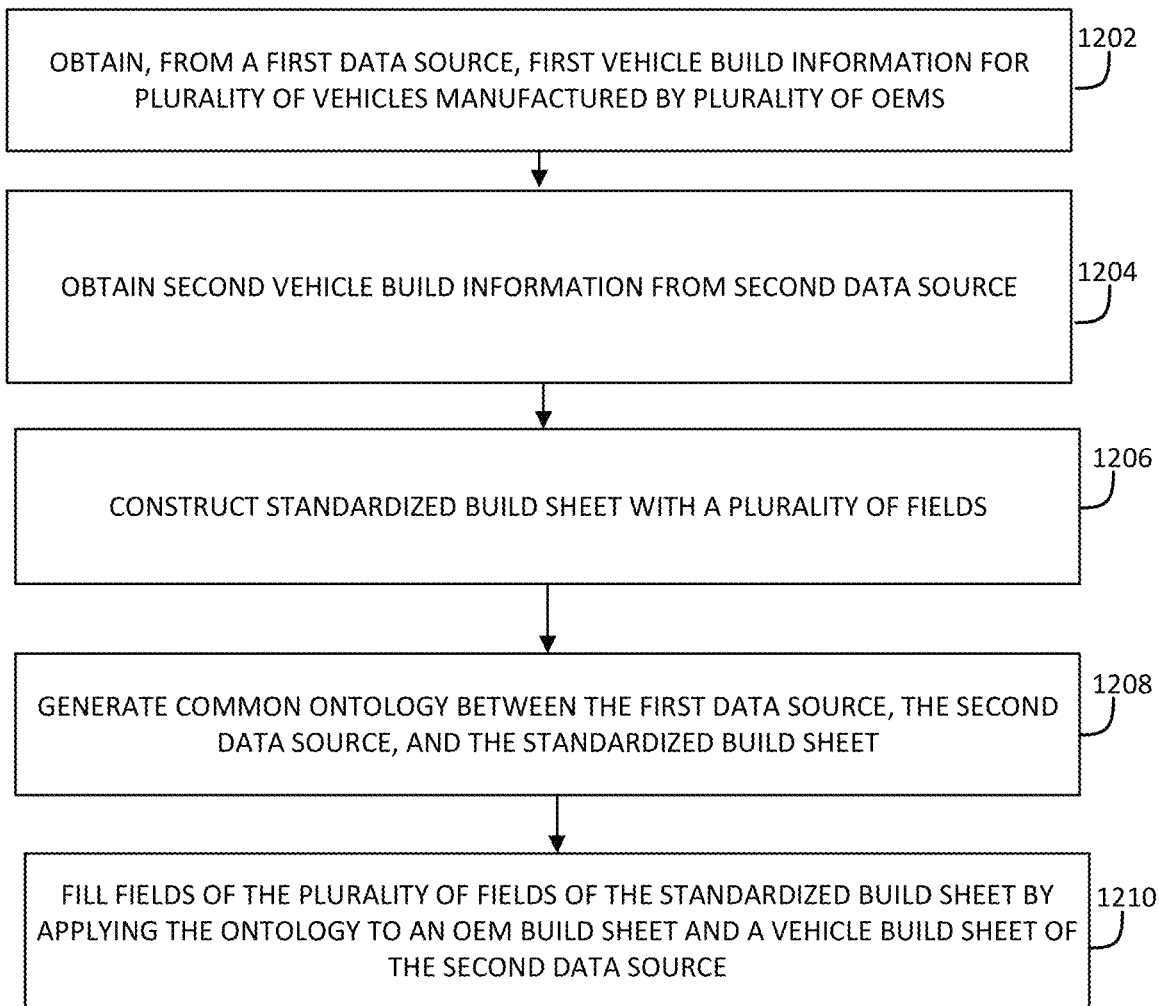
FIG. 12 illustrates an exemplary computer-implemented method of building a vehicle data repository, including creating a common ontology mapping between a first data source, a second data source, and a standardized build sheet.

FIG. 12 illustrates a flow diagram of an exemplary computer-implemented method 1200 for building a vehicle data repository, including creating a common ontology mapping between a first data source, a second data source, and a standardized build sheet. One or more steps of the method 1200 may be implemented as a set of instructions stored on a computer-readable memory and executable on one or more processors. It should be understood that the exemplary computer-implemented method 1200 may include additional, fewer, or alternate actions, including those discussed elsewhere herein.

At block 1202, first vehicle build information for a plurality of vehicles manufactured by a plurality of OEMs may be obtained from a first data source, e.g., from database(s) associated with each OEM. For example, the first vehicle build information obtained from each OEM may include information from vehicle build sheets for each individual vehicle manufactured by that OEM, with each vehicle build sheet listing all features of the individual vehicle.

At block 1204, second vehicle build information for a plurality of vehicles may be obtained from second data sources, e.g., from data source databases 750A, 750B, 750C. For example, the second vehicle build information obtained from the second data sources may include information from vehicle build sheets for each individual vehicle, with each vehicle build sheet listing all features of the individual vehicle. The second vehicle information may also include accident history of the vehicle.

At block 1206, a standardized build sheet is constructed. The standardized build sheet may include a plurality of fields, such as the plurality of fields illustrated in the example of FIG. 8B. In some embodiments, when the standardized datasheet is constructed, the plurality of fields are blank. In other embodiments, when the standardized datasheet is constructed, some or all of the plurality of fields are filled with default data.

At block 1208, the first vehicle build information, the second vehicle build information, and the plurality of fields of the standardized vehicle build sheet are analyzed to generate an ontology model mapping between all three of the first data source, the second data source, and the fields of the standardized build sheet. In some implementations, the second ontology may be created using a machine learning algorithm. The machine learning model may be of any suitable kind. For instance, the machine learning model may be any of a gradient boosting machine learning algorithm (e.g., XGBoost), a neural network, a deep learning algorithm, a regression technique, etc. In some embodiments, the machine learning algorithm may be trained as in the example of FIG. 8A.

At block 1210, fields of the plurality of fields of the standardized build sheet are filled by applying the ontology to an OEM build sheet (e.g., received at block 1202 or at any other time) and a vehicle build sheet of the second data source (e.g., received at block 1204 or at any other time). In some embodiments, the fields of the plurality of fields are also filled based upon selections between data from the first vehicle build information, and data from the second vehicle build information. For example, the fields may be filled based upon a determination of a best source for the information for each of the fields based upon reliability and detail of each of the respective data sources. In some embodiments, the information may be selected using a machine learning algorithm. The machine learning model may be of any suitable kind. For instance, the machine learning model may be any of a gradient boosting machine learning algorithm (e.g., XGBoost), a neural network, a deep learning algorithm, a regression technique, etc. In some embodiments, the machine learning algorithm may be trained as in the example of FIG. 8A.

In some embodiments, the VDR computing device 702 may also determine an insurance rating and/or risk rating for a particular vehicle based upon an effectiveness score associated with each feature associated with a particular vehicle. The insurance rating and/or risk rating may then be displayed to a user via, e.g., via a web interface or via the user interface 723.

Exemplary Construction of a Vehicle Data Repository

In one aspect, a computer-implemented method for building a vehicle data repository may be provided. The method may include: (1) obtaining, by one or more processors of a computer system 700 (e.g., one or more processors 720 of a VDR computing device 702), vehicle build information for a plurality of vehicles manufactured by a plurality of original equipment manufacturers (OEMs), the vehicle build information containing OEM-specific terminology associated with one or more features associated with each vehicle; (2) analyzing, by the one or more processors, obtained vehicle build information to generate an ontology model mapping each feature to any OEM-specific terminology associated with the feature for each OEM; (3) applying, by the one or more processors, the ontology model to the vehicle build information to generate translated vehicle build information for each of the plurality of vehicles, such that the OEM-specific terminology associated with each feature is replaced with OEM-agnostic terminology for the feature; (4) constructing, by the one or more processors, an OEM build sheet based upon the OEM-agnostic terminology; (5) obtaining, by the one or more processors, a vehicle build sheet from a second data source; and/or (6) constructing, by the one or more processors, a standardized build sheet comprising a plurality of fields, one field of the plurality of fields comprising a vehicle identification number (VIN), the standardized build sheet constructed by filling fields of the plurality of fields with information selected from the OEM build sheet and the vehicle build sheet from the second data source. The computer-implemented method may include additional, fewer, or alternate actions, including those discussed elsewhere herein.

The second data source may comprise one or more of: a National Highway Traffic Safety Administration (NHTSA) information database, a Highway Loss Data Institute (HLDI) information database, and/or an Insurance Institute for Highway Safety (IIHS) database.

The information may be selected from the OEM build sheet and the vehicle build sheet based upon a determination of a best source for the information for each of the fields based upon reliability and detail of each of the respective data sources.

The method may further include: training, by the one or more processors, a machine learning algorithm to fill at least one field of the standardized build sheet by selecting between information from terms of the OEM-agnostic terminology, and from terms of the vehicle build sheet from the second data source; and the construction of the standardized build sheet by filling fields of the plurality of fields with information selected from the OEM build sheet and the vehicle build sheet from the second data source may include inputting the information from the OEM build sheet and the vehicle build sheet from the second data source into the trained machine learning algorithm.

In some embodiments, the fields of the plurality of fields may include: mapping fields of the OEM build sheet to a first set of the plurality of fields of the standardized build sheet; and mapping fields of the vehicle build sheet from the second data source to a second set of the plurality of fields of the standardized build sheet.

In some embodiments, the method also may include: adding, by the one or more processors, the standardized build sheet to the vehicle data repository, wherein the standardized build sheet is a first standardized build sheet; constructing, by the one or more processors, a second OEM build sheet based upon the OEM-agnostic terminology; obtaining, by the one or more processors, a second vehicle build sheet from the second data source; constructing, by the one or more processors, a second standardized build sheet comprising a plurality of fields, one field of the plurality of fields of the second standardized build sheet comprising a VIN, the standardized build sheet constructed by filling fields of the plurality of fields of the second standardized build sheet with information selected from the second OEM build sheet and the second vehicle build sheet from the second data source; and adding, by the one or more processors, the second standardized build sheet to the vehicle data repository.

Filling the fields of the plurality of fields may further include extrapolating up at least some of the information selected from the OEM build sheet to a level of the standardized build sheet.

Filling the fields of the plurality of fields may further include predicting down, to a level of the standardized build sheet, at least some of the information selected from the vehicle build sheet.

Analyzing the obtained vehicle build information to generate an ontology model mapping each feature to OEM-specific terminology associated with the feature for each OEM may include: (i) training, by the one or more processors, a machine learning model using OEM-specific terminology associated with each of a plurality of known features for a plurality of OEMs; and (ii) applying, by the one or more processors, the trained machine learning model to the obtained vehicle build information in order to identify OEM-specific terminology associated with each feature for each OEM.

In some embodiments, the one or more features may be one or more smart safety features and, the method may further include: determining, by the one or more processors, an insurance rating for a particular vehicle based upon an effectiveness score associated with each smart safety feature associated with the particular vehicle.

In some implementations, the one or more features may be one or more smart safety features, and the method may further include: determining, by the one or more processors, a risk rating for a particular vehicle based upon an effectiveness score associated with each smart safety feature associated with the particular vehicle, wherein the risk rating indicates a likelihood that the particular vehicle will be in an accident.

In another aspect, a non-transitory computer-readable storage medium comprising instructions that, when executed, cause a processor of a computer system 700 (e.g., one or more processors 720 of a VDR computing device 702) to: (1) obtain first vehicle information from a first data source, the first data source including Original Equipment Manufacturer (OEM)—specific terminology; (2) obtain second vehicle information from a second data source, wherein the second vehicle information includes terminology specific to the second data source; (3) analyze the obtained first vehicle information and the second vehicle information to generate a first ontology model mapping at least some terms of the OEM-specific terminology with at least some terms of the terminology specific to the second data source; (4) construct a standardized build sheet comprising a plurality of fields, one field of the plurality of fields comprising a vehicle identification number (VIN); (5) analyze the first ontology model and the plurality of fields to generate a second ontology model mapping at least some terms of the first ontology model with fields of the plurality of fields; and/or (6) fill a second field of the plurality of fields by applying the second ontology to an OEM build sheet and a vehicle build sheet of the second data source. The non-transitory computer-readable storage medium may include instructions that provide and/or instruct additional, less, or alternate functionality, including that discussed elsewhere herein.

For example, in some embodiments, the instructions, when executed, further cause the processor to: add the standardized build sheet to the vehicle data repository, wherein the standardized build sheet is a first standardized build sheet; construct a second OEM build sheet based upon the first ontology model; obtain a second vehicle build sheet from the second data source; construct a second standardized build sheet comprising a plurality of fields, one field of the plurality of fields of the second standardized build sheet comprising a VIN, the standardized build sheet constructed by filling fields of the plurality of fields of the second standardized build sheet with information selected from the second OEM build sheet and the second vehicle build sheet from the second data source; and/or add the second standardized build sheet to the vehicle data repository.

In some embodiments, the instructions, when executed, further cause the processor to: train a machine learning algorithm to fill at least one field of the standardized build sheet by selecting between information from fields of the OEM build sheet, and from fields of the vehicle build sheet from the second data source; and wherein filling the second field of the plurality of fields further comprises applying the trained machine learning algorithm to select between data from the OEM build sheet and data from the vehicle build sheet of the second data source.

In some embodiments, the instructions, when executed, further cause the processor to: based upon a VIN of a particular vehicle, match the particular vehicle with the standardized build sheet; and determine an insurance rating for the particular vehicle based upon information from the plurality of fields of the standardized build sheet.

In some embodiments, the instructions, when executed, further cause the processor to: based upon a VIN of a particular vehicle, match the particular vehicle with the standardized build sheet; and determine a risk rating for the particular vehicle based upon information from the plurality of fields of the standardized build sheet, wherein the risk rating indicates a likelihood that the particular vehicle will be in an accident.

In yet another aspect, a computer system for building a vehicle data repository may be provided, such as a VDR computing device 702. The system may comprise: one or more processors, and a non-transitory program memory communicatively coupled to the one or more processors and storing executable instructions that, when executed by the one or more processors, cause the computer system to: (1) obtain first vehicle information from a first data source, the first data source including Original Equipment Manufacturer (OEM)—specific terminology; (2) obtain second vehicle information from a second data source, wherein the second vehicle information includes terminology specific to the second data source; (3) construct a standardized build sheet comprising a plurality of fields, one field of the plurality of fields comprising a vehicle identification number (VIN); (4) generate an ontology model mapping between all three of: (i) the OEM-specific terminology, (ii) the terminology specific to the second data source, and (iii) the plurality of fields; and/or (5) fill a second field of the plurality of fields by applying the ontology model to the first vehicle information and the second vehicle information. The computer system may include additional, less, or alternate functionality, including that discussed elsewhere herein.

In some embodiments, filling the second field further comprises selecting between the first vehicle information and the second vehicle information based upon a determination of a best source for the information for each of the fields based upon reliability and detail of each of the respective data sources.

In some embodiments, the instructions, when executed by the one or more processors, cause the computer system to: based upon a VIN of a particular vehicle, match the particular vehicle with the standardized build sheet; and determine an insurance rating for the particular vehicle based upon information from the plurality of fields of the standardized build sheet.

In some embodiments, the instructions, when executed by the one or more processors, cause the computer system to: based upon a VIN of a particular vehicle, match the particular vehicle with the standardized build sheet; and determine a risk rating for the particular vehicle based upon information from the plurality of fields of the standardized build sheet, wherein the risk rating indicates a likelihood that the particular vehicle will be in an accident.

Exemplary System for Generating a Reparability Metric

During a vehicle accident, various vehicle parts may be damaged. As such, following a vehicle accident, it is often useful to determine whether a damaged part should be repaired or replaced, and it may be further useful to determine a cost of repairing or replacing the damaged part. However, current systems for making these determinations are cumbersome and inefficient (e.g., in terms of processing efficiency, etc.). Thus, what is needed is a system that can more effectively and efficiently determine if a damage part should be replaced or repaired, and/or a cost of replacing or repairing the damaged part.

Figure 13:
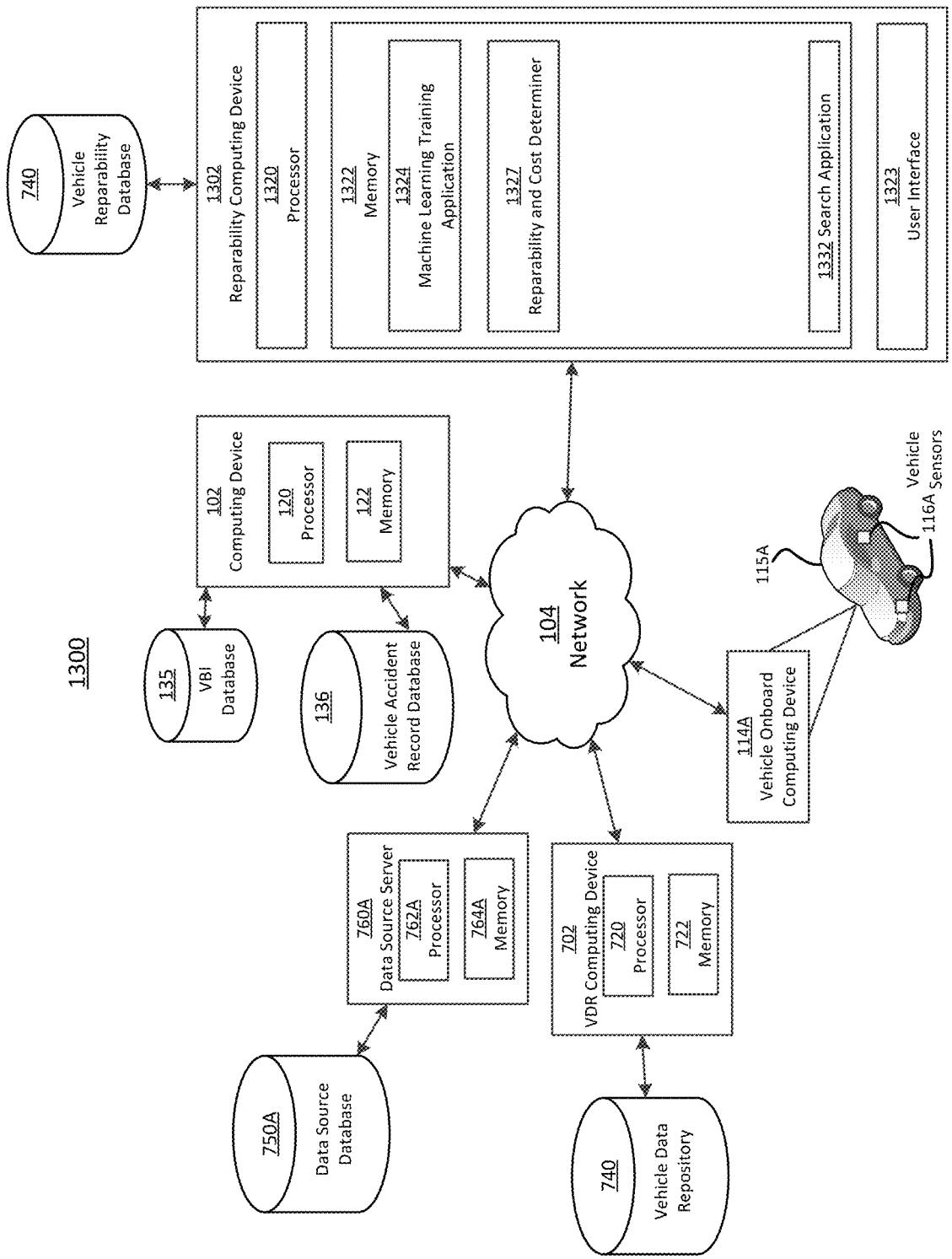
FIG. 13 illustrates an exemplary computer system for determining a vehicle reparability metric.

Such a system is provided in the example of FIG. 13, which illustrates an exemplary computer system 1300 for constructing a vehicle data repository 740, in accordance with some embodiments. The high-level architecture illustrated in FIG. 13 may include both hardware and software applications, as well as various data communications channels for communicating data between the various hardware and software components, as is described below. The system may include a computing device 102, VBI database 135, vehicle 115A, VDR computing device 702, VDR 740, data source server 760A, data source database 750A, and network 104, as described above (e.g., as described with respect to FIGS. 1 and/or 7). In this respect, in some embodiments, the example of FIG. 13 is an extension of the example of FIGS. 1 and/or 7.

The system may include a reparability computing device 1302 configured to communicate, e.g., via a network 104 (which may be a wired or wireless network), with data source server 760A, computing device 102, VDR computing device 702, and/or vehicle onboard computing device 114A. It may be noted that the example of FIG. 13 is illustrative, and not restrictive. For instance, although only one data source database 750A is illustrated, the system may include any number of data source databases. In another example, although only one onboard vehicle computing device 114A is illustrated, the system may include any number of vehicle onboard computing devices. There may be additional copies of other components as well.

It may be noted that in some embodiments, the data source database 750A, corresponds to a National Highway Traffic Safety Administration (NHTSA) information database, a Highway Loss Data Institute (HLDI) information database, and/or an Insurance Institute for Highway Safety (IIHS) database.

Furthermore, the reparability computing device 1302 may include one or more processors 1320 such as one or more microprocessors, controllers, and/or any other suitable type of processor. The reparability computing device 1302 may further include a memory 1322 (e.g., volatile memory, non-volatile memory) accessible by the one or more processors 1320, (e.g., via a memory controller). Additionally, the computing device may include a user interface 1323.

The one or more processors 1320 may interact with the memory 1322 to obtain, for example, computer-readable instructions stored in the memory 1322. Additionally or alternatively, computer-readable instructions may be stored on one or more removable media (e.g., a compact disc, a digital versatile disc, removable flash memory, etc.) that may be coupled to the reparability computing device 1302 to provide access to the computer-readable instructions stored thereon. In particular, the computer-readable instructions stored on the memory 1322 may include instructions for executing various applications, such as, e.g., a machine learning model training application 1324, a reparability and cost determiner 1327, and/or a search application 1332.

In general, the reparability computing device 1302 may generate a reparability metric of a damaged part. Broadly speaking, the reparability metric may be used for, inter alia, determining if a part should be repaired or replaced, and/or determining a cost to repair or replace the damaged part. For instance, the reparability computing device 1302 may compare the generated reparability metric to a threshold to determine if the part should be repaired or replaced.

To determine a cost to repair and/or replace the part based on the reparability metric, any suitable technique may be used. For instance, the cost may be determined based on a mathematical relationship (e.g., linear, polynomial, logarithmic, exponential, etc.) between the reparability metric and a dollar amount. Furthermore, a machine learning algorithm may be trained to translate from the reparability metric to the cost to repair the part or to the cost to replace the part.

To generate the reparability metric, a machine learning algorithm may be used. (It should be understood that, as used herein, the terms "machine learning algorithm" and "machine learning model" are used interchangeably). To this end, the machine learning algorithm may be trained by any suitable technique, such as that described in FIG. 14. In general, training the machine learning model may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

Figure 14:
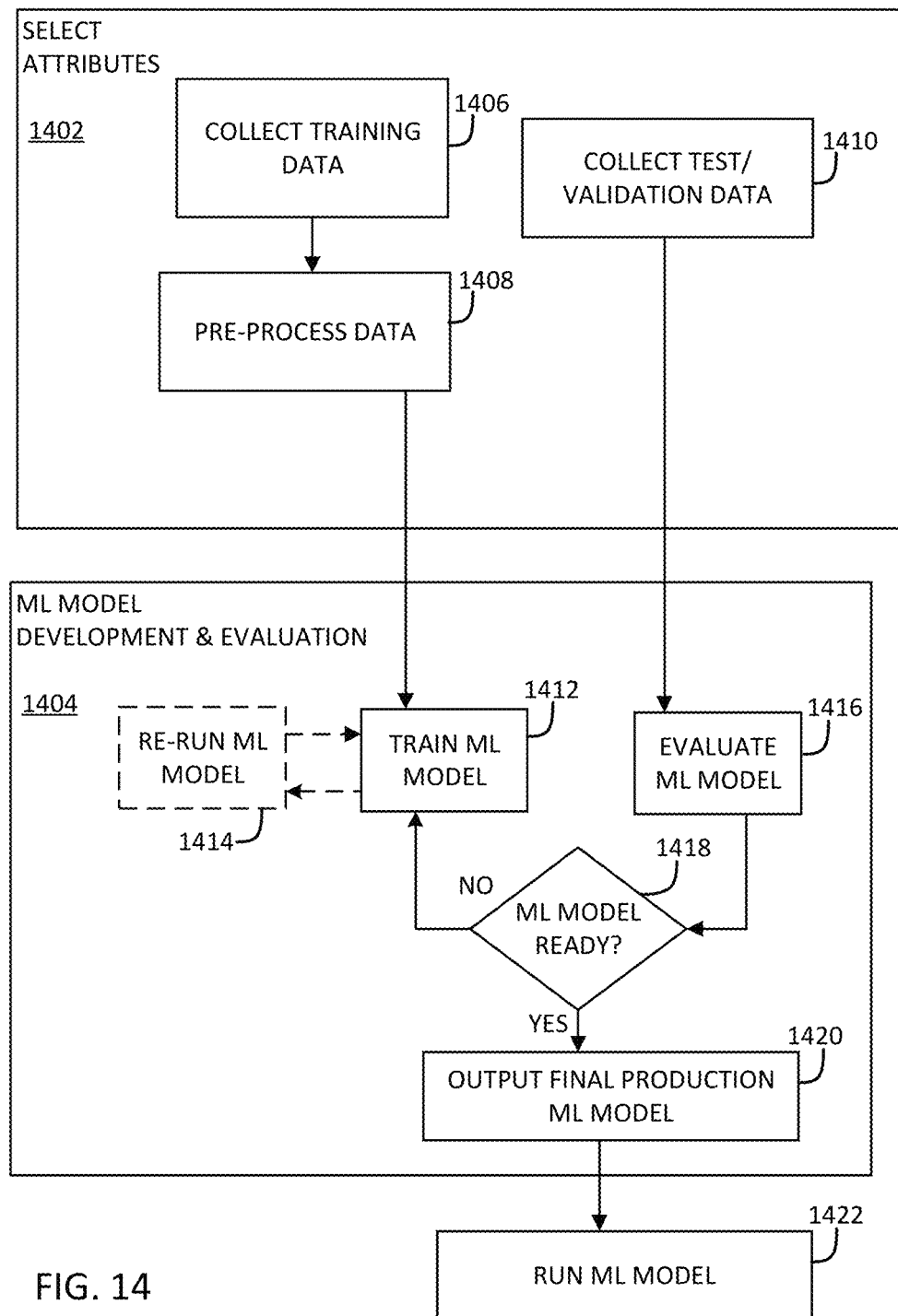
FIG. 14 illustrates an example of training a machine learning algorithm for determining a reparability metric, in accordance with some embodiments.

FIG. 14 is a block diagram of an exemplary machine learning modeling method 1400 for training and evaluating a machine learning model (e.g., a machine learning algorithm), in accordance with various embodiments. It should be understood that the principles of FIG. 14 may apply to any machine learning algorithm discussed herein. As will be discussed further below, in some embodiments, the machine learning model may be used to determine a reparability metric.

In some embodiments, the model "learns" an algorithm capable of determining a reparability metric (e.g., of a damaged vehicle part). At a high level, the machine learning modeling method 1400 includes a block 1402 for preparation of model input data, and a block 1404 for model training and evaluation. Depending on the embodiment, the model training, storage, and implementation may be performed at the reparability computing device 1302 or any other suitable component. In some embodiments, the training, storage, and implementation steps of the machine learning model may be performed at different computing devices or servers. For example, the machine learning model may be trained at any of the reparability computing device 1302, the VDR computing device 702, the computing device 102, the vehicle onboard computing device 114A, and/or the data source servers 760A, 760B, 760C; the machine learning model may then be stored and implemented at any of the reparability computing device 1302, VDR computing device 702, the computing device 102, the vehicle onboard computing device 114A, and/or the data source servers 760A, 760B, 760C.

Depending on implementation, one or more machine learning models may be trained at the same time. The different trained models may be further operated separately or in conjunction. Specific attributes in the training data sets may determine for which particular model each data set will be used. The determination may be made on attributes such as specific features of the information from any of the reparability computing device 1302, VDR computing device 702, the computing device 102, the vehicle onboard computing device 114A, and/or the data source servers 760A, 760B, 760C. Training multiple models may provide an advantage of expediting calculations and further increasing specificity of prediction for each model's particular instance space. For instance, different machine learning algorithms may be trained for specific vehicle parts. For example, one machine learning algorithm may be trained for when a bumper is damaged, and another machine learning algorithm may be trained for when a car door is smashed.

Depending on implementation, the machine learning model may be trained based upon supervised learning, unsupervised learning, or semi-supervised learning. Such learning paradigms may include reinforcement learning. Supervised learning is a learning process for learning the underlying function or algorithm that maps an input to an output based on example input-output combinations. A "teaching process" compares predictions by the model to known answers (labeled data) and makes corrections in the model. The trained algorithm is then able to make predictions of outputs based on the inputs. In such embodiments, the data (e.g., variables generated from vehicle data) may be labeled according to the corresponding output (e.g., reparability metric, or other desired output).

In some embodiments, the variables are any of the variables from the fields of a standardized build sheet (e.g., the standardized build sheet of FIG. 8B). For instance, the fields of a standardized build sheet may include: a vehicle identification number (VIN); vehicle make; vehicle model; vehicle model year; vehicle trim; vehicle drivetrain; vehicle body type; vehicle fuel type; vehicle number of engine cylinders; base manufacturer's suggested retail price (MSRP); MSRP; vehicle engine layout; vehicle engine capacity; vehicle engine horse-power (HP); vehicle transmission type; vehicle transmission speeds; vehicle wheelbase; vehicle curb weight; gross vehicle minimum weight; gross vehicle weight maximum; vehicle length; vehicle width; vehicle height; truck bed length; tire wheel diameter; tire aspect ratio; tire width tire construction; presence of adaptive cruise control; presence of adaptive cruise control with stop; presence of backup camera; presence of blind spot warning; presence of blind spot prevention; presence of automatic high beams; presence of adaptive headlights curve; presence of adaptive headlights distance; presence of adaptive driving beams; presence of forward collision warning; presence of forward collision warning with automatic emergency breaking (AEB); and/or presence of forward collision warning with AEB and pedestrian detection.

Additionally or alternatively, the machine learning algorithm may be trained by unsupervised learning (e.g., a learning process for generalizing the underlying structure or distribution in unlabeled data). In embodiments utilizing unsupervised learning, the system may rely on unlabeled vehicle parts data, variables corresponding to standardized build sheet fields 850, and/or any other information). During unsupervised learning, natural structures are identified and exploited for relating instances to each other. Semi-supervised learning can use a mixture of supervised and unsupervised techniques. This learning process discovers and learns the structure in the input variables, where typically some of the input data is labeled, and most is unlabeled. The training operations discussed herein may rely on any one or more of supervised, unsupervised, or semi-supervised learning with regard to the order data and delivery data, depending on the embodiment.

Block 1402 may include any one or more blocks or sub-blocks 1406-1410, which may be implemented in any suitable order. At block 1406, the machine learning training application 1324, executed by processor 1320 according to instructions on program memory 1322, may obtain training data from the computing device 102 and/or any of the data source servers 760A, 760B, 760C. The training data may include variables from the fields of a standardized build sheet mentioned above.

Initially, at block 1408, relevant data may be selected from among available data (e.g., historical data). Training data may be assessed and cleaned, including handling missing data and handling outliers. For example, missing records, zero values (e.g., values that were not recorded), incomplete data sets (e.g., for scenarios when data collection was not completed), outliers, and inconclusive data may be removed. In order to select high predictive value features, special feature engineering techniques may be used to derive useful features from the datasets. For example, data may be visualized for the underlying relationships to determine which feature engineering steps should be assessed for performance improvement. This step may include manually entering user input, for example via user interface 1323, which may include defining possible predictive variables for the machine learning model. Manual user input may also include manually including or excluding variables selection after running special feature engineering techniques. Manual user input may be guided by an interest to evaluate, for example, an interaction of two or more predictor variables (e.g., vehicle model, vehicle model year, etc.).

Furthermore, at block 1408, various measures may be taken to ensure a robust set of training data (e.g., providing standardized, heterogeneous data, removing outliers, imputing missing values, and so on). In certain embodiments, special feature engineering techniques may be used to extract or derive the best representations of the predictor variables to increase the effectiveness of the model. To avoid overfitting, in some embodiments feature reduction may be performed. In some embodiments, feature engineering techniques may include an analysis to remove uncorrelated features or variables. Variables may be evaluated in isolation to eliminate low predictive value variables, for example, by applying a cut-off value.

In this regard, in some embodiments, a list of variables (e.g., variables of the standardized build sheet fields 850) is considered (e.g., input into the machine learning algorithm to train the machine learning algorithm). Then, for each variable, a correlation metric may be generated showing a correlation between the variable and the cost to repair the vehicle. The generated correlation metrics may then be compared to a threshold; and, if a correlation metric for a variable is below the threshold, the variable may be removed while training the machine learning algorithm. Advantageously, removing variables in this way while training the machine learning algorithm shortens the time it takes to train the machine learning algorithm, and further improves the accuracy of the final trained machine learning algorithm. Furthermore, the threshold may be increased or decreased, depending on how many variables it is desired to train the machine learning algorithm on. For instance, the threshold may be set such that a particular percentage (e.g., 25%, 50%, 75%, etc.) of variables are removed.

In one example, the list of variables is inputted into the machine learning algorithm and the correlation metrics are determined. Variables such as vehicle make and vehicle model are determined to have a high correlation metric (e.g., more expensive vehicles tend to cost more to repair). On the other hand, variables such as weather conditions during the accident and presence of adaptive cruise control are determined to have a low correlation metric (e.g., it costs the same amount to repair a vehicle no matter what the weather conditions were when the accident occurred). In this example, it may be that the variables with the lower correlation metric (e.g., weather conditions during the accident, and presence of adaptive cruise control) are removed, while the variables with the higher correlation metrics (e.g., vehicle make and vehicle model) are used to train (or further train) the machine learning algorithm. It may be noted that the generation of the correlation metrics and removal of variables may happen at any point in the example process 1400 (e.g., block 1408, 1412, etc.).

At block 1410, the machine learning training application 1324 receives test data for testing the model or validation data for validating the model (e.g., from one of the described respective data sources). Some or all of the training, test, or validation data sets may be labeled with pre-determined answers (e.g., based upon a desired common terminology, or known answer about what information is best to select for the standardized build sheet, etc.).

Block 1404 illustrates an example machine learning (ML) model development and evaluation phase. Block 1404 may include any one or more blocks or sub-blocks 1412-1420, which may be implemented in any suitable order. In one example, at block 1412, the training module trains the machine learning model by running one or more pre-processed training data sets described above. At block 1414, the training module re-runs several iterations of the machine learning model. At block 1416, the training module evaluates the machine learning model, at block 1418 the training module determines whether or not the machine learning model is ready for deployment before either proceeding to block 1420 to output final production model or returning to block 1412 to further develop, test, or validate the model.

Regarding block 1412, developing the model typically involves training the model using training data. At a high level, the machine learning model may be utilized to discover relationships between various observable features (e.g., between predictor features and target features) in a training dataset, which can then be applied to an input dataset to predict unknown values for one or more of these features given the known values for the remaining features. At block 1404, these relationships are discovered by feeding the model pre-processed training data including instances each having one or more predictor feature values and one or more target feature values. The model then "learns" an algorithm capable of calculating or predicting the target feature values (e.g., to select information for the standardized build sheet, or to build a common ontology) given the predictor feature values.

At block 1412, the machine learning model may be trained (e.g., by the reparability computing device 1302) to thereby generate the machine learning model. Techniques for training/generating the machine learning model may include gradient boosting, neural networks, deep learning, linear regression, polynomial regression, logistic regression, support vector machines, decision trees, random forests, nearest neighbors, or any other suitable machine learning technique. In some examples, reparability computing device 1302 implements gradient boosting machine learning (for example, using the open source extreme gradient boosting (XGBoost) algorithm) with a secondary application of the model for close cases and/or error correction. In embodiments, training the machine learning model may include training more than one model according to the selected method(s) on the data pre-processed at block 1408 implementing different method(s) and/or using different sub-sets of the training data, or according to other criteria.

In some embodiments, the machine learning algorithm is trained by creating groups from inputted vehicle data (e.g., the variables of the standardized build sheet fields 850, any other inputted vehicle data). The groups may be based on any suitable criteria. For instance, the groups may be created based upon: (i) frequency of repairing vehicle parts, (ii) frequency of repairing a vehicle part along with another vehicle part, (iii) cost of repairing vehicle parts, (iv) cost or replacing vehicle parts; and/or (v) insurance claims.

In some implementations where the groups are based on the frequency of repairing or replacing vehicle parts, the frequency of repairing or replacing vehicle parts may be the frequency of repairing or replacing vehicle parts in a particular category defined by the OEM-agnostic terminology. In some implementations where the groups are based on the cost of repairing vehicle parts, the cost of replacing vehicle parts, the vehicle data (e.g., that the machine learning algorithm is being trained on) includes vehicle model information, and the groups are created based on the vehicle model information. Advantageously, in some implementations, creating groups based on vehicle model information improves accuracy of the machine learning algorithm.

In some implementations where the groups are created based on insurance claims, the vehicle data (e.g., that the machine learning algorithm is being trained on) includes vehicle build information; subgroups may be created based on the vehicle build information; and the machine learning algorithm may be trained based upon the created subgroups.

Training the machine learning model may include re-running the model (at optional block 1414) to improve the accuracy of prediction values. For example, re-running the model may improve model training when implementing gradient boosting machine learning. In another implementation, re-running the model may be necessary to assess the differences caused by an evaluation procedure. For example, available data sets in the vehicle accident records database 136, the computing device 102, any of the data source servers 760A, 760B, 760C, and/or any other data source may be split into training and testing data sets by randomly assigning sub-sets of data to be used to train the model or evaluate the model to meet the predefined train or test set size, or an evaluation procedure may use a k-fold cross validation. Both of these evaluation procedures are stochastic, and, as such, each evaluation of a deterministic ML model, even when running the same algorithm, provides a different estimate of error or accuracy. The performance of these different model runs may be compared using one or more accuracy metrics, for example, as a distribution with mean expected error or accuracy and a standard deviation. In implementations, the models may be evaluated using metrics such as root mean square error (RMSE), to measure the accuracy of prediction values.

Regarding block 1416, evaluating the model typically involves testing the model using testing data or validating the model using validation data. Testing/validation data typically includes both predictor feature values and target feature values (e.g., including order demand patterns for which corresponding delivery patterns are known), enabling comparison of target feature values predicted by the model to the actual target feature values, enabling one to evaluate the performance of the model. This testing/validation process is valuable because the model, when implemented, will generate target feature values for future input data that may not be easily checked or validated. Thus, it is advantageous to check one or more accuracy metrics of the model on data for which the target answer is already known (e.g., testing data or validation data), and use this assessment as a proxy for predictive accuracy on future data. Example accuracy metrics include key performance indicators, comparisons between historical trends and predictions of results, cross-validation with subject matter experts, comparisons between predicted results and actual results, etc.

Regarding block 1418, the processor 1320 may utilize any suitable set of metrics to determine whether or not to proceed to block 1420 to output the final production model. Generally speaking, the decision to proceed to block 1420 or to return to block 1412 will depend on one or more accuracy metrics generated during evaluation (block 1416). After the sub-blocks 1412-1418 of block 1404 have been completed, the processor 1320 may implement block 1420.

At block 1420, the machine learning model is output. The machine learning model may be stored for later use. At block 1422, the machine learning model is run. For example, information of a particular part may be input into the trained machine learning algorithm to determine a reparability metric for the particular part.

Figure 15:
FIG. 15 illustrates an exemplary display for displaying repair information of a vehicle part.

Once the reparability metric has been generated, a determination as to whether the part is reparable is made, and a cost to repair the part may be generated (e.g., by the reparability and cost determiner 1327). A user may wish to view this information; and, to this end, FIG. 15 illustrates an exemplary display of a dashboard for displaying repair information of a vehicle part. In particular, FIG. 15 illustrates an example display of a user interface (e.g., user interface 1323) showing information relating a damaged vehicle part. In this example, the damaged part is a bumper, although it should be understood that this example is only illustrative, and the systems and methods disclosed herein apply to any other type of part as well. In the illustrated example, the display shows: a type of the part, an indication of whether it is possible to repair the part, an estimated cost to repair the part, an estimated cost to replace the part, a picture of the damaged part, and a picture of a new, undamaged part. The illustrated example display further includes information of the vehicle of the damaged part (e.g., information including a VIN, vehicle make, vehicle model, vehicle year, features information, vehicle engine type, vehicle body type, vehicle drive type, and vehicle transmission type).

Returning now to FIG. 13, the search application 1332 may provide a search feature to be displayed to a user, e.g., via a web interface or via the user interface 1323. In one example, the search application 1332 may receive user input indicating a vehicle identification number (VIN) to be searched, and may search the vehicle build information to locate a matching vehicle and its associated standardized build sheet to thereby display the associated information (e.g., from the fields of the standardized build sheet). Accordingly, the search application 1332 may cause the user interface 1323 to display, based upon the user input, a listing of vehicle features, accident history information, and/or any other information associated with the VIN. As another example, the search application 1332 may receive user input indicating a search term to be searched, and may cause the user interface 1323 to display, based upon the user input, a listing of vehicles based upon the search term. In some examples, the user may use any terminology (e.g., data source-specific terminology or data source-agnostic terminology) for the feature, and the ontology model may be used to translate the user's input into data source-agnostic terminology for the feature. Accordingly, the search application 1332 may search the vehicle build information using the data source-agnostic terminology and locate results to be displayed to the user. In some embodiments where the standardized build sheet includes insurance claim information, a user may input insurance claim information (e.g., an insurance claim number), which the search application 1332 will use to search and display results to the user.

Furthermore, the user may use the search application 1332 to search for a type of part or a particular part. For instance, the user may search generally for parts (e.g., search generally for bumpers) or search specifically for a particular bumper (e.g., to find information of his own damaged bumper). If the user searches generally for parts, he may scroll though the results (e.g., scroll through parts, each with a page corresponding to the example page of FIG. 15). For example, if the user searches for bumpers, he may scroll through pages of individual bumpers.

Exemplary Methods for Vehicle Part Reparability Determination

Figure 16:
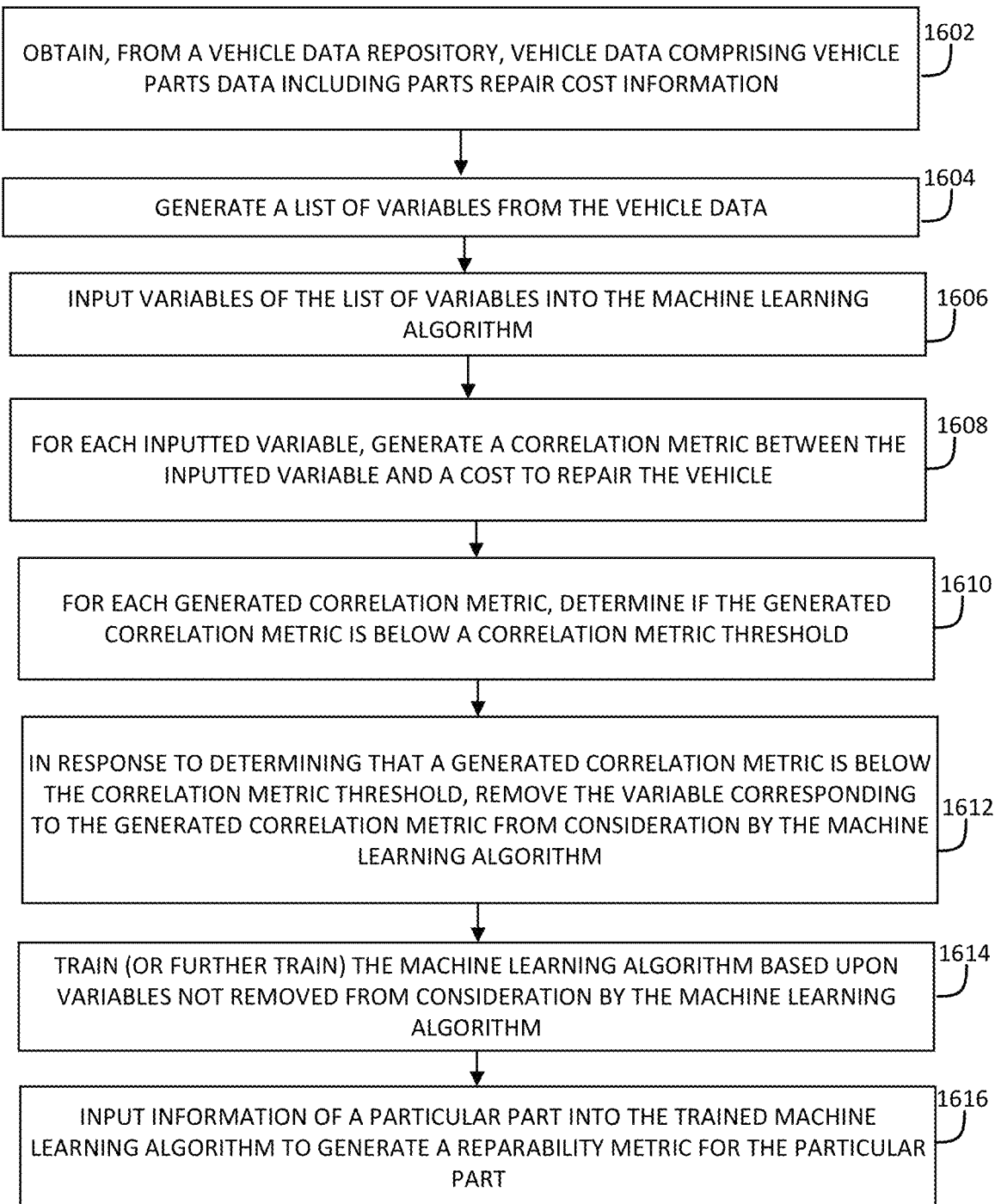
FIG. 16 illustrates an example computer-implemented method of generating a reparability metric, including removing one or more variables while training a machine learning algorithm.

FIG. 16 illustrates a flow diagram of an exemplary computer-implemented method 1600 for determining reparability of a vehicle, including removing one or more variables while training a machine learning algorithm. One or more steps of the method 1600 may be implemented as a set of instructions stored on a computer-readable memory and executable on one or more processors. It should be understood that the exemplary computer-implemented method 1600 may include additional, fewer, or alternate actions, including those discussed elsewhere herein.

The exemplary implementation begins at block 1602 where vehicle data comprising vehicle parts data including parts repair cost information and part replacement cost is obtained (e.g., by the reparability computing device 1302) from the vehicle data repository 740. The obtained vehicle data comprising vehicle parts data, including parts repair cost information and part replacement cost information, may include any type of information. For instance, the vehicle data may include: invoice information including a cost amount for a cost to repair or replace a part; insurance claim information; a description of damaged parts; information from OEM build sheets or any other vehicle build sheets; information corresponding to any of the standardized build sheet fields 850; etc.

Furthermore, in some embodiments, prior to obtaining the vehicle data, to streamline the data gathering process, an ontology model may be created and applied. For instance, an ontology model mapping between OEM-specific terminology and OEM-agnostic terminology (e.g., for AVSFs or more generally for any vehicle features) as described herein may be created and applied.

At block 1604, a list of variables is generated from the vehicle data. In some embodiments, the variables on the list of variables include any or all of the information corresponding to any of the standardized build sheet fields 850. For instance, the variables may include: a vehicle identification number (VIN); vehicle make; vehicle model; vehicle model year; vehicle trim; vehicle drivetrain; vehicle body type; vehicle fuel type; vehicle number of engine cylinders; base manufacturer's suggested retail price (MSRP); MSRP; vehicle engine layout; vehicle engine capacity; vehicle engine horsepower (HP); vehicle transmission type; vehicle transmission speeds; vehicle wheelbase; vehicle curb weight; gross vehicle minimum weight; gross vehicle weight maximum; vehicle length; vehicle width; vehicle height; truck bed length; tire wheel diameter; tire aspect ratio; tire width tire construction; presence of adaptive cruise control; presence of adaptive cruise control with stop; presence of backup camera; presence of blind spot warning; presence of blind spot prevention; presence of automatic high beams; presence of adaptive headlights curve; presence of adaptive headlights distance; presence of adaptive driving beams; presence of forward collision warning; presence of forward collision warning with automatic emergency breaking (AEB); and/or presence of forward collision warning with AEB and pedestrian detection.

The variables may further include information specific to particular types of parts. For instance, the variables may further include details about damage to the part which may be useful to determining the reparability metric. For instance, if the part is a bumper, the variables may include information of if the bumper was damaged on a right end portion of the bumper, a middle portion of the bumper, and/or a left end portion of the bumper. These details may be useful in ultimately determining the cost to repair a part and/or the cost to replace a part.

At block 1606, to train the machine learning algorithm, the variables are input into the machine learning algorithm (e.g., by the reparability computing device 1302). As described above with respect to FIG. 14, this training process may involve supervised learning, unsupervised learning, and/or semi-supervised learning.

At block 1608, for each inputted variable, a correlation metric between the inputted variable and a cost to repair the vehicle is generated. For example, variables such as vehicle make and vehicle model may be determined to have a high correlation metric; whereas, variables such as weather conditions during the accident, and presence of adaptive cruise control may be determined to have a low correlation metric.

At block 1610, generated correlation metrics are compared to a threshold. In some embodiments, if a correlation metric is below the threshold, the corresponding variable is removed from the training process (block 1612). Advantageously, removing variables in this way while training the machine learning algorithm shortens the time it takes to train the machine learning algorithm, and further improves the accuracy of the final trained machine learning algorithm. Furthermore, the threshold may be increased or decreased, depending on how many variables it is desired to train the machine learning algorithm on. For instance, the threshold may be set such that a particular percentage (e.g., 25%, 50%, 75%, etc.) of variables are removed.

It may be noted that blocks 1608-1612 may happen at any time throughout the training process. For example, these blocks may occur before the machine learning algorithm has been trained at all. Alternatively, these blocks may occur after the machine learning algorithm has already been partially or wholly trained. For example, if the machine learning algorithm comprises a neural network, the neural network may be partially or wholly trained before the variables are removed.

At block 1614, the machine learning algorithm is trained (or further trained) based upon the remaining variables. Such training may be performed by any of the systems and techniques described herein.

At block 1616, information of a particular part is input into the machine learning algorithm to determine a reparability metric for the particular part. Any amount of information may be input. For instance, the vehicle make and vehicle model may be known along with information that the bumper has been damaged. In this example, this known information may be input into the trained machine learning algorithm to generate the reparability metric for the bumper. As should be understood, the more information that is input into the machine learning algorithm, generally the more accurate the reparability metric will be.

In some embodiments, the information of the particular part is first converted to the OEM-agnostic terminology, or other agnostic terminology (e.g., terminology to match the terminology of the standardized build sheet) to allow for mapping between the terms of the information of the particular part and terms of other data sources.

Moreover, the information of a particular part may further include details about the damage to the part. For instance, if a bumper is damaged, the information may include if the bumper is damaged on a right end portion of the bumper, a middle portion of the bumper, and/or a left end portion of the bumper.

Furthermore, prior to inputting the information of the particular part into the trained machine learning algorithm, the information may be obtained (e.g., by the reparability computing device 1302) from any suitable source (e.g., the VDR computing device 702).

Subsequently, in some embodiments, to determine if the particular part should be repaired or replaced, the reparability metric is compared to a threshold. If the reparability metric is below the threshold, it may be determined that the particular part should be replaced. If the reparability metric is above the threshold, it may be determined that the particular part should be repaired, and a cost estimate based on the reparability metric may be determined. To determine a cost to repair the part based on the reparability metric, any suitable technique may be used. For instance, the cost may be determined based on a mathematical relationship (e.g., linear, polynomial, logarithmic, exponential, etc.) between the reparability metric and a dollar amount. Furthermore, a machine learning algorithm may be trained to translate from the reparability metric to the cost to repair the part.

In addition, a dashboard (e.g., as in the example of FIG. 15) may display the generated cost estimate along with any other relevant information (e.g., the name of the type of part, VIN, vehicle make, vehicle model, etc.).

Figure 17:
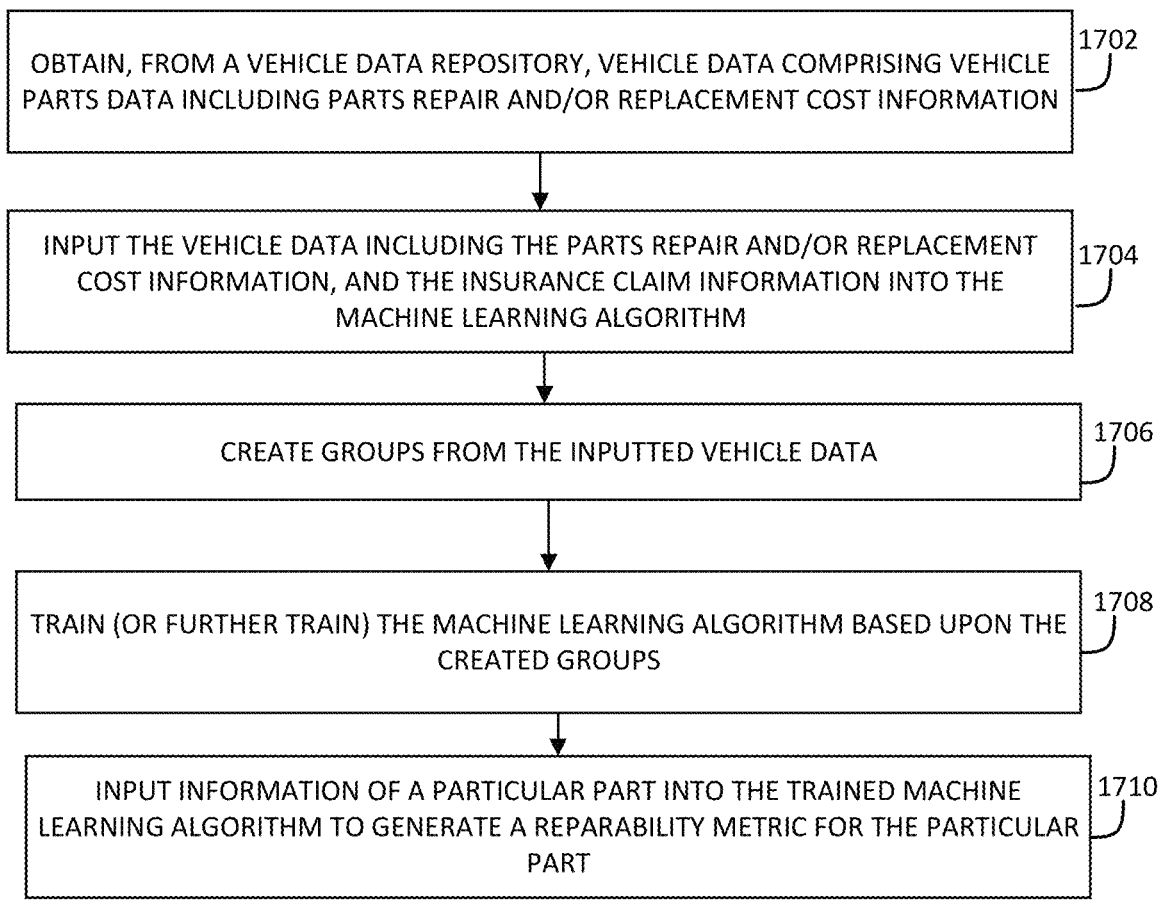
FIG. 17 illustrates an example computer-implemented method of generating a reparability metric, including creating groups based upon input vehicle data to train a machine learning algorithm.

FIG. 17 illustrates a flow diagram of an exemplary method 1700 for determining reparability of a vehicle, including creating groups based upon input vehicle data to train a machine learning algorithm. One or more steps of the method 1700 may be implemented as a set of instructions stored on a computer-readable memory and executable on one or more processors. It should be understood that the example method 1700 may include additional, fewer, or alternate actions, including those discussed elsewhere herein.

The example implementation begins at block 1702 where vehicle data comprising vehicle parts data including parts repair cost information (and/or parts replacement cost information) is obtained (e.g., by the reparability computing device 1302) from the vehicle data repository 740. The obtained vehicle data comprising vehicle parts data including parts repair cost information (and/or parts replacement cost information) may include any type of information. For instance, the vehicle data may include: invoice information including a cost amount for a cost to repair or replace a part; insurance claim information; a description of damaged parts; information from OEM build sheets or any other vehicle build sheets; information corresponding to any of the standardized build sheet fields 850; etc.

Furthermore, in some embodiments, prior to obtaining the vehicle data, to streamline the data gathering process, an ontology model may be created and applied. For instance, an ontology model mapping between OEM-specific terminology and OEM-agnostic terminology (e.g., for AVSFs or more generally for any vehicle features) as described herein may be created and applied.

At block 1704, to train the machine learning algorithm, the variables are input into the machine learning algorithm (e.g., by the reparability computing device 1302). As described above with respect to FIG. 14, this training process may involve supervised learning, unsupervised learning, and/or semi-supervised learning.

At block 1706, groups are created from the inputted vehicle data. In some embodiments, the groups are created based upon one or more of: (i) frequency of repairing vehicle parts, (ii) frequency of repairing a vehicle part along with another vehicle part, (iii) cost of repairing vehicle parts, (iv) cost of replacing vehicle parts; and/or (v) insurance claims.

In some implementations, the frequency of repairing and/or replacing vehicle parts may be the frequency of repairing and/or replacing vehicle repair parts in a particular category (e.g., fender, hood, door, side panel, mirror, wheels, engine, axles, on-board computers, etc.) defined by OEM-agnostic terminology (e.g., for AVSFs or more generally for any vehicle features) as described elsewhere herein.

In some implementations where the groups are created based upon the cost of repairing parts (and/or the cost of replacing parts), the groups may be created based upon vehicle model information, vehicle build information, insurance claim information, etc. In this regard, the machine learning algorithm may determine the relevant features that may delineate vehicles with a higher expected cost of repair from those with a lower expected cost of repair. It has been found that groups created on this basis may produce a better machine learning algorithm (e.g., in terms of accuracy of the generated reparability metrics) than groups created, for example, on the basis of MSRP. Additionally or alternatively, where the groups are created based upon the cost of repairing parts (and/or the cost or replacing parts), the groups may be further created based upon vehicle build information. It may be noted that the groups may be created before the machine learning algorithm has been trained at all. In one example of the groups being created before the machine learning algorithm is used, contextual (e.g., point of impact) information or vehicle body type (e.g., 4-door sedan vs. truck, etc.) may be used to form the groups. Alternatively, the groups may be created after the training of the machine learning algorithm has started.

At block 1708, the machine learning algorithm is trained (or further trained) based upon the created groups. Such training may be performed by any of the systems and techniques described herein.

At block 1710, information of a particular part is input into the machine learning algorithm to determine a reparability metric for the particular part. Any amount of information may be input. For instance, the vehicle make and vehicle model may be known along with information that the hood has been damaged. In this example, this known information may be input into the trained machine learning algorithm to generate the reparability metric for the hood. As should be understood, the more information that is input into the machine learning algorithm, generally the more accurate the reparability metric will be.

Moreover, the information of a particular part may further include details about the damage to the part. For instance, if a hood is damaged, the information may include if the hood is damaged on a front portion of the hood, a middle portion of the hood, and/or an end portion of the hood.

Furthermore, prior to inputting the information of the particular part into the trained machine learning algorithm, the information may be obtained (e.g., by the reparability computing device 1302) from any suitable source (e.g., the VDR computing device 702).

Subsequently, in some embodiments, to determine if the particular part should be repaired or replaced, the reparability metric is compared to a threshold. If the reparability metric is below the threshold, it may be determined that the particular part should be replaced. If the reparability metric is above the threshold, it may be determined that the particular part should be repaired, and a cost estimate based on the reparability metric may be determined. To determine a cost to repair the part (and/or the cost to replace the part) based on the reparability metric, any suitable technique may be used. For instance, the cost may be determined based on a mathematical relationship (e.g., linear, polynomial, logarithmic, exponential, etc.) between the reparability metric and a dollar amount. Furthermore, a machine learning algorithm may be trained to translate from the reparability metric to the cost to repair the part.

In addition, a dashboard (e.g., as in the example of FIG. 15) may display the generated repair cost estimate (and/or replacement cost estimate) along with any other relevant information (e.g., the name of the type of part, VIN, vehicle make, vehicle model, etc.).

Exemplary Vehicle Part Reparability Determination

In one aspect, a computer-implemented method for use in determining reparability of a vehicle may be provided. The method may comprise: (1) obtaining, by one or more processors of a computer system 1300 (e.g., one or more processors 1320 of the reparability computing device 1302), vehicle data from a vehicle data repository, the vehicle data comprising vehicle parts data including parts repair cost information, and the vehicle data being stored in an original equipment manufacturer (OEM)—agnostic terminology; (2) generating, by the one or more processors, a list of variables from the vehicle data; (3) training, by the one or more processors, a machine learning algorithm to generate a reparability metric by: (a) inputting variables of the list of variables into the machine learning algorithm; (b) for each inputted variable, generating a correlation metric between the inputted variable and a cost to repair the vehicle (and/or generating a correlation metric between the inputted variable and a cost to replace the vehicle); (c) for each generated correlation metric, determining if the generated correlation metric is below a correlation metric threshold; (d) in response to determining that a generated correlation metric is below the correlation metric threshold, removing the variable corresponding to the generated correlation metric from consideration by the machine learning algorithm; and (e) further training the machine learning algorithm based upon variables not removed from consideration by the machine learning algorithm; and (4) inputting, by the one or more processors, information of a particular part into the trained machine learning algorithm to generate a reparability metric for the particular part. The method may include additional, fewer, or alternate actions, including those discussed elsewhere herein.

In some embodiments, the method further comprises, prior to obtaining the vehicle data from a vehicle data repository: obtaining, by the one or more processors, vehicle build information for a plurality of vehicles manufactured by a plurality of original equipment manufacturers (OEMs), the vehicle build information containing OEM-specific terminology associated with one or more smart safety features associated with each vehicle; analyzing, by the one or more processors, obtained vehicle build information to generate an ontology model mapping each smart safety feature to any OEM-specific terminology associated with the smart safety feature for each OEM; applying, by the one or more processors, the ontology model to the vehicle build information to generate translated vehicle build information for each of the plurality of vehicles, such that the OEM-specific terminology associated with each smart safety feature is replaced with the OEM-agnostic terminology for the smart safety feature; and building, by the one or more processors, the vehicle data repository by: (i) building OEM build sheets based upon the vehicle information, and (ii) adding the OEM build sheets to the vehicle data repository.

In some implementations, the method may further include: determining that the generated reparability metric for the particular part is above a reparability metric threshold; and in response to the determination that the generated reparability metric is above the reparability metric threshold, determining that the part is repairable. In alternate implementations, the method may further include: determining that the generated reparability metric for the particular part is below a reparability metric threshold; and in response to the determination that the generated reparability metric is below the reparability metric threshold, determining that the part is replaceable.

In some embodiments, the method further comprises, further in response to the determination that the generated reparability metric is above the reparability metric threshold, generating a cost estimate to repair the part based upon the reparability metric. In alternate embodiments, the method further comprises, further in response to the determination that the generated reparability metric is below the reparability metric threshold, generating a cost estimate to replace the part based upon the reparability metric.

In some implementations, the variables of the list of variables include: a speed at which a vehicle was traveling at when an accident occurred; a portion of a vehicle impacted by the accident; weather conditions during the accident; vehicle make; vehicle model; vehicle model year; vehicle trim; vehicle drivetrain; vehicle body type; vehicle fuel type; vehicle number of engine cylinders; presence of adaptive cruise control; presence of adaptive cruise control with stop; presence of backup camera; presence of blind spot warning; presence of blind spot prevention; presence of automatic high beams; presence of adaptive headlights curve; presence of adaptive headlights distance; presence of adaptive driving beams; and/or presence of forward collision warning.

In some embodiments, the method further comprises, prior to inputting the information of the particular part into the trained machine learning algorithm: obtaining, by the one or more processors, the information of the particular part from the vehicle data repository, the information of the particular part including a part name, a vehicle information number (VIN) of a vehicle of the particular part, a vehicle make of the vehicle of the particular part, and a vehicle model of the vehicle of the particular part.

In another aspect, a computer system for use in determining reparability of a vehicle may be provided, such as the reparability computing device 1302. The system may comprise: one or more processors; and a non-transitory program memory communicatively coupled to the one or more processors and storing executable instructions that, when executed by the one or more processors, cause the computer system to: (1) obtain vehicle data from a vehicle data repository, the vehicle data comprising vehicle parts data including parts repair cost information, and the vehicle data being stored in an original equipment manufacturer (OEM)—agnostic terminology; (2) generate a list of variables from the vehicle data; (3) train a machine learning algorithm to generate a reparability metric by: (a) inputting variables of the list of variables into the machine learning algorithm; (b) for each inputted variable, generating a correlation metric between the inputted variable and a cost to repair the vehicle; (c) for each generated correlation metric, determining if the generated correlation metric is below a correlation metric threshold; (d) in response to determining that a generated correlation metric is below the correlation metric threshold, removing the variable corresponding to the generated correlation metric from consideration by the machine learning algorithm; and (e) further training the machine learning algorithm based upon variables not removed from consideration by the machine learning algorithm; and (4) input information of a particular part into the trained machine learning algorithm to generate a reparability metric for the particular part. The computer system may include additional, less, or alternate functionality, including that discussed elsewhere herein.

In some embodiments, the instructions, when executed by the one or more processors, cause the computer system to, prior to obtaining the vehicle data from a vehicle data repository: obtain vehicle build information for a plurality of vehicles manufactured by a plurality of original equipment manufacturers (OEMs), the vehicle build information containing OEM-specific terminology associated with one or more smart safety features associated with each vehicle; analyze obtained vehicle build information to generate an ontology model mapping each smart safety feature to any OEM-specific terminology associated with the smart safety feature for each OEM; apply the ontology model to the vehicle build information to generate translated vehicle build information for each of the plurality of vehicles, such that the OEM-specific terminology associated with each smart safety feature is replaced with the OEM-agnostic terminology for the smart safety feature; and build the vehicle data repository by: (i) building OEM build sheets based upon the vehicle information, and (ii) adding the OEM build sheets to the vehicle data repository.

In some implementations, the instructions, when executed by the one or more processors, cause the computer system to: determine that the generated reparability metric for the particular part is above a reparability metric threshold; and in response to the determination that the generated reparability metric is above the reparability metric threshold, determine that the part is repairable. In other implementations, the instructions, when executed by the one or more processors, cause the computer system to: determine that the generated reparability metric for the particular part is below a reparability metric threshold; and in response to the determination that the generated reparability metric is below the reparability metric threshold, determine that the part is replaceable.

In some embodiments, the instructions, when executed by the one or more processors, cause the computer system to: further in response to the determination that the generated reparability metric is above the reparability metric threshold, generate a cost estimate to repair the part based upon the reparability metric. In some embodiments, the instructions, when executed by the one or more processors, cause the computer system to: further in response to the determination that the generated reparability metric is below the reparability metric threshold, generate a cost estimate to replace the part based upon the reparability metric.

In some implementations, the variables of the list of variables include: a speed at which a vehicle was traveling at when an accident occurred; a portion of a vehicle impacted by the accident; weather conditions during the accident; vehicle make; vehicle model; vehicle model year; vehicle trim; vehicle drivetrain; vehicle body type; vehicle fuel type; vehicle number of engine cylinders; presence of adaptive cruise control; presence of adaptive cruise control with stop; presence of backup camera; presence of blind spot warning; presence of blind spot prevention; presence of automatic high beams; presence of adaptive headlights curve; presence of adaptive headlights distance; presence of adaptive driving beams; and/or presence of forward collision warning.

In some embodiments, the instructions, when executed by the one or more processors, cause the computer system to, prior to the input of the information of the particular part into the trained machine learning algorithm: obtain the information of the particular part from the vehicle data repository, the information of the particular part including a part name, a vehicle information number (VIN) of a vehicle of the particular part, a vehicle make of the vehicle of the particular part, and a vehicle model of the vehicle of the particular part.

In yet another aspect, a non-transitory computer-readable storage medium comprising instructions that, when executed, cause a processor of a computer system 1300 (e.g., one or more processors 1320 of the reparability computing device 1302) to: (1) obtain vehicle data from a vehicle data repository, the vehicle data comprising vehicle parts data including parts repair cost information, and insurance claim information, and the vehicle data being stored in an original equipment manufacturer (OEM)—agnostic terminology; (2) train a machine learning algorithm to generate a reparability metric by: (a) inputting the vehicle data including the parts repair cost information, and the insurance claim information into the machine learning algorithm; (b) creating groups from the inputted vehicle data, the groups based on one or more of: (i) frequency of repairing and/or replacing vehicle parts, (ii) frequency of repairing a vehicle part along with another vehicle part, (iii) cost of repairing or replacing vehicle parts, and/or (iv) insurance claims; and (c) further training machine learning algorithm based upon the created groups; and (3) input information of a particular part into the trained machine learning algorithm to generate a reparability metric for the particular part. The non-transitory computer readable medium may include instructions that direct additional, less, or alternate functionality, including that discussed elsewhere herein.

For instance, in some embodiments, the instructions, when executed, further cause the processor to, prior to obtaining the vehicle data from a vehicle data repository: obtain, by the one or more processors, vehicle build information for a plurality of vehicles manufactured by a plurality of original equipment manufacturers (OEMs), the vehicle build information containing OEM-specific terminology associated with one or more smart safety features associated with each vehicle; analyze, by the one or more processors, obtained vehicle build information to generate an ontology model mapping each smart safety feature to any OEM-specific terminology associated with the smart safety feature for each OEM; apply, by the one or more processors, the ontology model to the vehicle build information to generate translated vehicle build information for each of the plurality of vehicles, such that the OEM-specific terminology associated with each smart safety feature is replaced with the OEM-agnostic terminology for the smart safety feature; and build, by the one or more processors, the vehicle data repository by: (i) building OEM build sheets based upon the vehicle information, and (ii) adding the OEM build sheets to the vehicle data repository.

In some implementations: (i) the groups are created based on the frequency of repairing and/or replacing vehicle parts, and (ii) the frequency of repairing and/or replacing vehicle parts is the frequency of repairing and/or replacing vehicle parts in a particular category defined by the OEM-agnostic terminology.

In some embodiments, the groups are created based on the frequency of repairing the vehicle part along with another vehicle part. In some implementations, the groups are created based on the cost of repairing and/or replacing vehicle parts; the vehicle data further includes vehicle model information; and the groups are further created based on vehicle model information.

In some embodiments, the groups are created based on the insurance claims; the vehicle data further comprises vehicle build information; and the instructions, when executed, further cause the processor to further train the machine learning algorithm to generate the reparability metric by: creating subgroups based upon the vehicle build information; and training the machine learning algorithm further based upon the created subgroups.

In some implementations, the instructions, when executed, further cause the processor to: determine that the generated reparability metric for the particular part is above a reparability metric threshold; and in response to the determination that the generated reparability metric is above the reparability metric threshold: determine that the part is repairable; and generate a cost estimate to repair the part based upon the reparability metric.

In some implementations, the instructions, when executed, further cause the processor to: determine that the generated reparability metric for the particular part is below a reparability metric threshold; and in response to the determination that the generated reparability metric is below the reparability metric threshold: determine that the part is replaceable; and generate a cost estimate to replace the part based upon the reparability metric.

In some embodiments, the instructions, when executed, further cause the processor to cause a display to display a dashboard displaying: (i) a name of a type of the part, and (ii) the generated cost estimate, such as the cost estimate to repair the part, or the cost estimate to replace the part.

Additional Considerations

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method for use in determining reparability of a vehicle, the method comprising:
   obtaining, by one or more processors, vehicle data from a vehicle data repository, the vehicle data comprising vehicle parts data including parts repair cost information, and the vehicle data being stored in an original equipment manufacturer (OEM)—agnostic terminology;
   generating, by the one or more processors, a list of variables from the vehicle data;
   training, by the one or more processors, a machine learning algorithm to generate a reparability metric by:
      inputting variables of the list of variables into the machine learning algorithm;
      for each inputted variable, generating a correlation metric between the inputted variable and a cost to repair the vehicle;
      for each generated correlation metric, determining if the generated correlation metric is below a correlation metric threshold;
      in response to determining that a generated correlation metric is below the correlation metric threshold, removing the variable corresponding to the generated correlation metric from consideration by the machine learning algorithm;
      training the machine learning algorithm based upon variables not removed from consideration by the machine learning algorithm; and
      further training the machine learning algorithm by re-running the machine learning algorithm; and
   inputting, by the one or more processors, information of a particular part into the trained machine learning algorithm to generate a reparability metric for the particular part.

2. The computer-implemented method of claim 1, further comprising, prior to obtaining the vehicle data from a vehicle data repository:
   obtaining, by the one or more processors, vehicle build information for a plurality of vehicles manufactured by a plurality of original equipment manufacturers (OEMs), the vehicle build information containing OEM-specific terminology associated with one or more smart safety features associated with each vehicle;
   analyzing, by the one or more processors, obtained vehicle build information to generate an ontology model mapping each smart safety feature to any OEM-specific terminology associated with the smart safety feature for each OEM;
   applying, by the one or more processors, the ontology model to the vehicle build information to generate translated vehicle build information for each of the plurality of vehicles, such that the OEM-specific terminology associated with each smart safety feature is replaced with the OEM-agnostic terminology for the smart safety feature; and
   building, by the one or more processors, the vehicle data repository by: (i) building OEM build sheets based upon the vehicle information, and (ii) adding the OEM build sheets to the vehicle data repository.

3. The computer-implemented method of claim 1, further comprising:
   determining, by the one or more processors, that the generated reparability metric for the particular part is above a reparability metric threshold; and
   in response to the determination that the generated reparability metric is above the reparability metric threshold, determining, by the one or more processors, that the part is repairable.

4. The computer-implemented method of claim 3, further comprising:
   further in response to the determination that the generated reparability metric is above the reparability metric threshold, generating, by the one or more processors, a cost estimate to repair the part based upon the reparability metric.

5. The computer-implemented method of claim 1, wherein the variables of the list of variables include:

a speed at which a vehicle was traveling at when an accident occurred;
a portion of a vehicle impacted by the accident;
weather conditions during the accident;
vehicle make;
vehicle model;
vehicle model year;
vehicle trim;
vehicle drivetrain;
vehicle body type;
vehicle fuel type;
vehicle number of engine cylinders;
presence of adaptive cruise control;
presence of adaptive cruise control with stop;
presence of backup camera;
presence of blind spot warning;
presence of blind spot prevention;
presence of automatic high beams;
presence of adaptive headlights curve;
presence of adaptive headlights distance;
presence of adaptive driving beams; and/or
presence of forward collision warning.

6. The computer-implemented method of claim 1, further comprising, prior to inputting the information of the particular part into the trained machine learning algorithm:
obtaining, by the one or more processors, the information of the particular part from the vehicle data repository, the information of the particular part including a part name, a vehicle information number (VIN) of a vehicle of the particular part, a vehicle make of the vehicle of the particular part, and a vehicle model of the vehicle of the particular part.

7. The computer-implemented method of claim 1, wherein:
a variable of the list of variables is a weather conditions during an accident variable;
determining if the generated correlation metric is below a correlation metric threshold comprises determining that the weather conditions during the accident variable is below the correlation metric threshold; and
the method further comprises in response to the determining that the weather conditions during the accident variable is below the correlation metric threshold, removing, by the one or more processors, the weather conditions during the accident variable from consideration by the machine learning algorithm.

8. The computer-implemented method of claim 1, further comprising setting, by the one or more processors, the correlation metric threshold such that a particular percentage of the variables of the list of variables are removed.

9. A computer system for use in determining reparability of a vehicle, the system comprising:
one or more processors; and
a non-transitory program memory communicatively coupled to the one or more processors and storing executable instructions that, when executed by the one or more processors, cause the computer system to:
obtain vehicle data from a vehicle data repository, the vehicle data comprising vehicle parts data including parts repair cost information, and the vehicle data being stored in an original equipment manufacturer (OEM)—agnostic terminology;
generate a list of variables from the vehicle data;
train a machine learning algorithm to generate a reparability metric by:
inputting variables of the list of variables into the machine learning algorithm;
for each inputted variable, generating a correlation metric between the inputted variable and a cost to repair the vehicle;
for each generated correlation metric, determining if the generated correlation metric is below a correlation metric threshold;
in response to determining that a generated correlation metric is below the correlation metric threshold, removing the variable corresponding to the generated correlation metric from consideration by the machine learning algorithm;
training the machine learning algorithm based upon variables not removed from consideration by the machine learning algorithm; and
further training the machine learning algorithm by re-running the machine learning algorithm; and
input information of a particular part into the trained machine learning algorithm to generate a reparability metric for the particular part.

10. The computer system of claim 9, wherein the instructions, when executed by the one or more processors, cause the computer system to, prior to obtaining the vehicle data from a vehicle data repository:
obtain vehicle build information for a plurality of vehicles manufactured by a plurality of original equipment manufacturers (OEMs), the vehicle build information containing OEM-specific terminology associated with one or more smart safety features associated with each vehicle;
analyze obtained vehicle build information to generate an ontology model mapping each smart safety feature to any OEM-specific terminology associated with the smart safety feature for each OEM;
apply the ontology model to the vehicle build information to generate translated vehicle build information for each of the plurality of vehicles, such that the OEM-specific terminology associated with each smart safety feature is replaced with the OEM-agnostic terminology for the smart safety feature; and
build the vehicle data repository by: (i) building OEM build sheets based upon the vehicle information, and (ii) adding the OEM build sheets to the vehicle data repository.

11. The computer system of claim 9, wherein the instructions, when executed by the one or more processors, cause the computer system to:
determine that the generated reparability metric for the particular part is above a reparability metric threshold; and
in response to the determination that the generated reparability metric is above the reparability metric threshold, determine that the part is repairable.

12. The computer system of claim 11, wherein the instructions, when executed by the one or more processors, cause the computer system to:
further in response to the determination that the generated reparability metric is above the reparability metric threshold, generate a cost estimate to repair the part based upon the reparability metric.

13. The computer system of claim 9, wherein the variables of the list of variables include:
a speed at which a vehicle was traveling at when an accident occurred;
a portion of a vehicle impacted by the accident;
weather conditions during the accident;
vehicle make;
vehicle model;

vehicle model year;
vehicle trim;
vehicle drivetrain;
vehicle body type;
vehicle fuel type;
vehicle number of engine cylinders;
presence of adaptive cruise control;
presence of adaptive cruise control with stop;
presence of backup camera;
presence of blind spot warning;
presence of blind spot prevention;
presence of automatic high beams;
presence of adaptive headlights curve;
presence of adaptive headlights distance;
presence of adaptive driving beams; and/or
presence of forward collision warning.

14. The computer system of claim 9, wherein the instructions, when executed by the one or more processors, cause the computer system to, prior to the input of the information of the particular part into the trained machine learning algorithm:
obtain the information of the particular part from the vehicle data repository, the information of the particular part including a part name, a vehicle information number (VIN) of a vehicle of the particular part, a vehicle make of the vehicle of the particular part, and a vehicle model of the vehicle of the particular part.

15. A non-transitory computer-readable storage medium comprising instructions that, when executed, cause a processor to:
obtain vehicle data from a vehicle data repository, the vehicle data comprising vehicle parts data including parts repair cost information, and insurance claim information, and the vehicle data being stored in an original equipment manufacturer (OEM)—agnostic terminology;
train a machine learning algorithm to generate a reparability metric by:
inputting the vehicle data including the parts repair cost information, and the insurance claim information into the machine learning algorithm;
creating groups from the inputted vehicle data, the groups based upon one or more of: (i) frequency of repairing vehicle parts, (ii) frequency of repairing a vehicle part along with another vehicle part, (iii) cost of repairing vehicle parts, and/or (iv) insurance claims;
training machine learning algorithm based upon the created groups; and
further training the machine learning algorithm by re-running the machine learning algorithm; and
input information of a particular part into the trained machine learning algorithm to generate a reparability metric for the particular part.

16. The non-transitory computer-readable storage medium of claim 15, wherein the instructions, when executed, further cause the processor to, prior to obtaining the vehicle data from a vehicle data repository:
obtain, by the one or more processors, vehicle build information for a plurality of vehicles manufactured by a plurality of original equipment manufacturers (OEMs), the vehicle build information containing OEM-specific terminology associated with one or more smart safety features associated with each vehicle;
analyze, by the one or more processors, obtained vehicle build information to generate an ontology model mapping each smart safety feature to any OEM-specific terminology associated with the smart safety feature for each OEM;
apply, by the one or more processors, the ontology model to the vehicle build information to generate translated vehicle build information for each of the plurality of vehicles, such that the OEM-specific terminology associated with each smart safety feature is replaced with the OEM-agnostic terminology for the smart safety feature; and
build, by the one or more processors, the vehicle data repository by: (i) building OEM build sheets based upon the vehicle information, and (ii) adding the OEM build sheets to the vehicle data repository.

17. The non-transitory computer-readable storage medium of claim 15, wherein: (i) the groups are created based upon the frequency of repairing vehicle parts, and (ii) the frequency of repairing vehicle parts is the frequency of repairing vehicle repair parts in a particular category defined by the OEM-agnostic terminology.

18. The non-transitory computer-readable storage medium of claim 15, wherein the groups are created based upon the frequency of repairing the vehicle part along with another vehicle part.

19. The non-transitory computer-readable storage medium of claim 15, wherein:
the groups are created based upon the cost of repairing vehicle parts;
the vehicle data further includes vehicle model information; and
the groups are further created based upon vehicle model information.

20. The non-transitory computer-readable storage medium of claim 15, wherein:
the groups are created based upon the insurance claims;
the vehicle data further comprises vehicle build information; and
the instructions, when executed, further cause the processor to further train the machine learning algorithm to generate the reparability metric by:
creating subgroups based upon the vehicle build information; and
training the machine learning algorithm further based upon the created subgroups.

21. The non-transitory computer-readable storage medium of claim 15, wherein the instructions, when executed, further cause the processor to:
determine that the generated reparability metric for the particular part is above a reparability metric threshold; and
in response to the determination that the generated reparability metric is above the reparability metric threshold:
determine that the part is repairable; and
generate a cost estimate to repair the part based upon the reparability metric.

22. The non-transitory computer-readable storage medium of claim 21, wherein the instructions, when executed, further cause the processor to cause a display to display a dashboard displaying: (i) a name of a type of the part, and (ii) the generated cost estimate.

* * * * *